United States Patent
Ippatapu

(10) Patent No.: US 10,645,158 B1
(45) Date of Patent: May 5, 2020

(54) HOST DATA REPLICATION USING DEDUPLICATION AND BINARY SEARCH TREES

(71) Applicant: EMC IP Holding Company LLC, Hopkinton, MA (US)

(72) Inventor: Venkata L. R. Ippatapu, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 47 days.

(21) Appl. No.: 15/728,758

(22) Filed: Oct. 10, 2017

(51) Int. Cl.
*G06F 3/06* (2006.01)
*H04L 29/08* (2006.01)
*H04L 29/06* (2006.01)

(52) U.S. Cl.
CPC .......... *H04L 67/1095* (2013.01); *G06F 3/065* (2013.01); *G06F 3/067* (2013.01); *G06F 3/0619* (2013.01); *G06F 3/0641* (2013.01); *H04L 67/1097* (2013.01); *H04L 69/16* (2013.01)

(58) Field of Classification Search
None
See application file for complete search history.

(56) References Cited

U.S. PATENT DOCUMENTS

| 5,544,347 A | 8/1996 | Yanai et al. |
| 5,742,792 A | 4/1998 | Yanai et al. |
| 6,968,369 B2 | 11/2005 | Veprinsky et al. |
| 7,054,883 B2 * | 5/2006 | Meiri ................. G06F 11/2064 |
| 8,082,231 B1 | 12/2011 | McDaniel et al. |
| 2013/0024460 A1 * | 1/2013 | Peterson ................ G06F 3/061 707/741 |
| 2018/0364917 A1 * | 12/2018 | Ki ........................ G06F 3/0608 |

OTHER PUBLICATIONS

P.F. Windley, et al., "Binary search tree," Retrieved from https://en.wikipedia.org/w/index.php?title=Binary_search_tree&oldid=801134990, Sep. 17, 2017.

* cited by examiner

*Primary Examiner* — Cai Y Chen
(74) *Attorney, Agent, or Firm* — Muirhead and Saturnelli, LLC

(57) ABSTRACT

Techniques for processing write operations may include: receiving, at a first data storage system, a write operation that writes first data to a first device, wherein the first device is configured for replication on a second device of a second data storage system; writing the first data to the first device of the first data storage system; performing first processing that converts the first data to a deduplicated data representation; transmitting the deduplicated data representation from the first data storage system to the second data storage system; and responsive to receiving the deduplicated data representation, performing second processing on the second data storage system that converts the deduplicated data representation to its original form in accordance with the first data.

20 Claims, 17 Drawing Sheets

HOST DATA REPLICATION USING DEDUPLICATION AND BINARY SEARCH TREES

BACKGROUND

Technical Field

This application generally relates to data storage and more particularly to techniques used in connection with data deduplication and data replication.

Description of Related Art

Computer systems may include different resources used by one or more host processors. Resources and host processors in a computer system may be interconnected by one or more communication connections. These resources may include, for example, data storage devices such as those included in the data storage systems manufactured by Dell Inc. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Data storage systems, hosts and other components may be interconnected by one or more communication connections such as in a network configuration. The network may support transmissions in accordance with well-known protocols such as TCP/IP (Transmission Control Protocol/Internet Protocol), UDP (User Datagram Protocol), and the like. Networked storage systems, such as data storage arrays, may be used to maintain data on different systems in different locations. Such mirroring may be used for a variety of reasons including reducing the likelihood of data loss. For example, in some implementations, a primary or source data site, such as a first or primary data storage system, may be configured in a partner relationship with a second or remote data storage system whereby the second data storage system includes a mirror or copy of data of one or more devices of the first data storage system.

SUMMARY OF THE INVENTION

In accordance with one aspect of the invention is a method of processing write operations comprising: receiving, at a first data storage system, a write operation that writes first data to a first device, wherein the first device is configured for replication on a second device of a second data storage system; writing the first data to the first device of the first data storage system; performing first processing that converts the first data to a deduplicated data representation; transmitting the deduplicated data representation from the first data storage system to the second data storage system; and responsive to receiving the deduplicated data representation, performing second processing on the second data storage system that converts the deduplicated data representation to its original form in accordance with the first data. The first processing may include partitioning the first data into a plurality of data blocks. The first processing may include traversing the plurality of data blocks and creating a node in a binary search tree for each unique data block included in the plurality of data blocks, wherein the node includes a key value corresponding to a position of said each unique data block in the first data and the node includes the data block as a data value. The deduplicated data representation may include a deduplication bit vector with a different entry corresponding to each of the plurality of data blocks, and wherein the deduplicated data representation may include deduplicated write data corresponding to the first data. An entry of the deduplication bit vector corresponding to a particular one of the plurality of data blocks may indicate whether the deduplicated write data includes the particular one of the data blocks or otherwise includes a reference to the particular one the data blocks. The second processing may include determining, in accordance with the deduplication bit vector and the deduplicated write data, a restored version of deduplicated write data. The second processing may include traversing each entry of the deduplication bit vector corresponding to one of the plurality of data blocks of the first data and determining whether said each entry indicates the deduplicated write data includes the one data block or otherwise includes a reference to the one data block. The second processing may include: if said each entry indicates the deduplicated write data includes the one data block, copying the one data block from the deduplicated write data to the restored version of deduplicated write data; and if said each entry indicates the deduplicated write data includes the reference to the one data block, copying the one data block pointed to by the reference from the deduplicated write data to the restored version of the deduplicated write data. The reference may identify a position in the first data of the one data block where the position occurs in the first data prior to another position in the first data associated with said each entry. The first device may be configured for synchronous replication on a second device of the second data storage system. The first device may be configured for asynchronous replication on a second device of the second data storage system.

In accordance with another aspect of techniques herein is a system comprising: a first data storage system with a first memory and at a first processor, wherein the first memory includes code that, when executed, performs a method comprising: receiving a write operation that writes first data to a first device, wherein the first device is configured for replication on a second device of a second data storage system; writing the first data to the first device of the first data storage system; performing first processing that converts the first data to a deduplicated data representation; and transmitting the deduplicated data representation from the first data storage system to the second data storage system; and the second data storage system with a second memory and at a second processor, wherein the second memory includes code that, when executed, performs a method comprising: responsive to receiving the deduplicated data representation, performing second processing on the second data storage system that converts the deduplicated data representation to its original form in accordance with the first data.

In accordance with another aspect of techniques herein is a computer readable medium comprising code stored thereon that, when executed, perform a method of processing write operations comprising: receiving, at a first data storage system, a write operation that writes first data to a first device, wherein the first device is configured for replication on a second device of a second data storage system; writing the first data to the first device of the first data storage system; performing first processing that converts the first data to a deduplicated data representation; transmitting the deduplicated data representation from the first data storage system to the second data storage system; and responsive to receiving the deduplicated data representation, performing second processing on the second data storage system that converts the deduplicated data representation to its original form in accordance with the first data. The first processing may include partitioning the first data into a plurality of data blocks. The first processing may include traversing the plurality of data blocks and creating a node in a binary search tree for each unique data block included in the plurality of data blocks, wherein the node includes a key value corresponding to a position of said each unique data block in the first data and the node includes the data block as a data value. The deduplicated data representation may include a deduplication bit vector with a different entry corresponding to each of the plurality of data blocks, and wherein the deduplicated data representation includes deduplicated write data corresponding to the first data. An entry of the deduplication bit vector corresponding to a particular one of the plurality of data blocks may indicate whether the deduplicated write data includes the particular one of the data blocks or otherwise includes a reference to the particular one the data blocks. The second processing may include determining, in accordance with the deduplication bit vector and the deduplicated write data, a restored version of deduplicated write data. The second processing may include traversing each entry of the deduplication bit vector corresponding to one of the plurality of data blocks of the first data and determining whether said each entry indicates the deduplicated write data includes the one data block or otherwise includes a reference to the one data block. The second processing may include: if said each entry indicates the deduplicated write data includes the one data block, copying the one data block from the deduplicated write data to the restored version of deduplicated write data; and if said each entry indicates the deduplicated write data includes the reference to the one data block, copying the one data block pointed to by the reference from the deduplicated write data to the restored version of the deduplicated write data, and wherein the reference identifies a position in the first data of the one data block where the position occurs in the first data prior to another position in the first data associated with said each entry.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
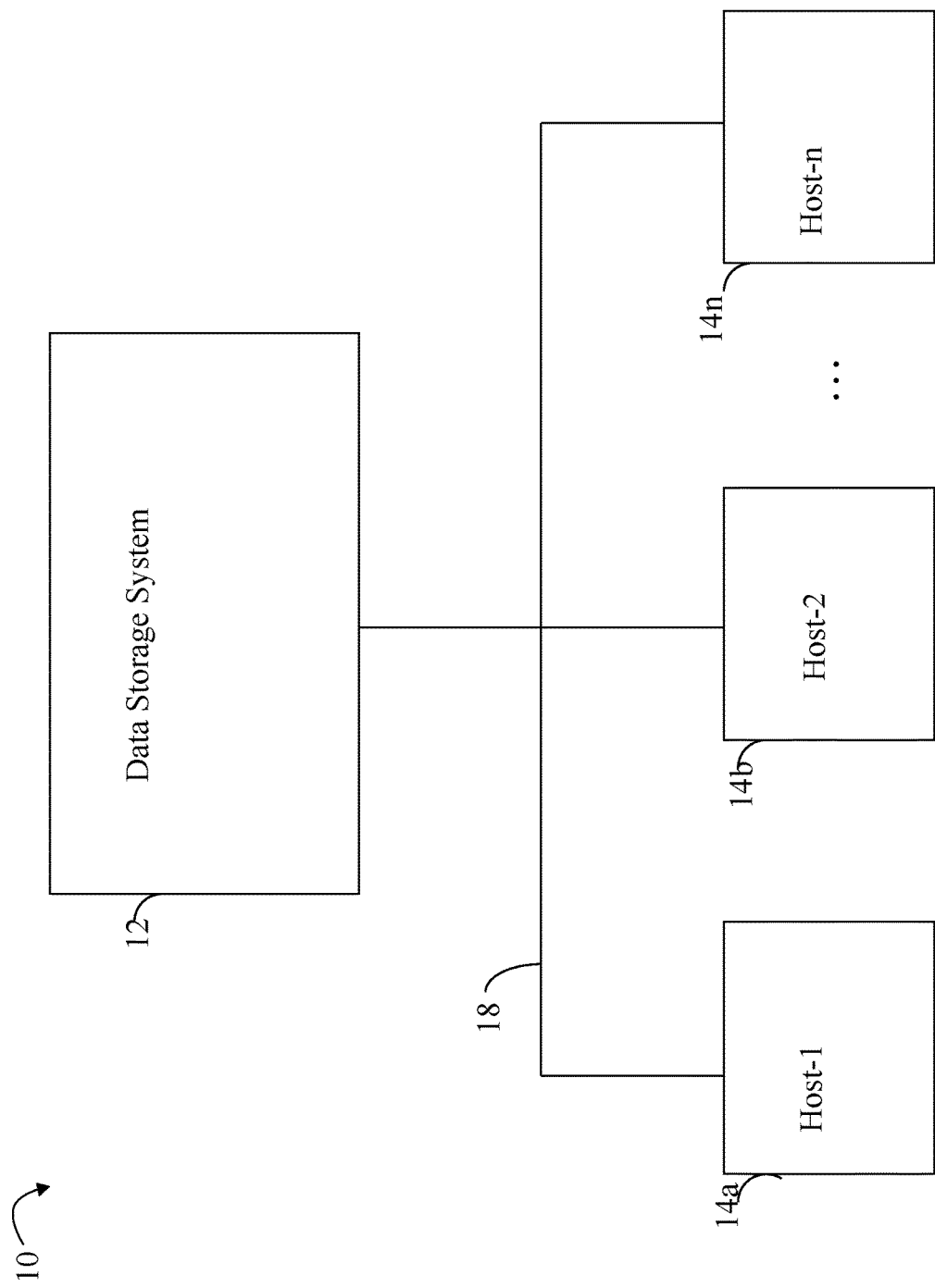
FIG. 1 is an example of an embodiment of a computer system that may utilize the techniques described herein.

Referring now to FIG. 1, shown is an example of an embodiment of a system that may be used in performing the techniques described herein. The system 10 includes a data storage system 12 connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, ESCON, Fibre Channel, iSCSI, or GIGE (Gigabit Ethernet), and the like. Some or all of the connections by which the hosts and data storage system 12 may be connected to the communication medium 18 may pass through other communication devices, such as switching equipment, a phone line, a repeater, a multiplexer or even a satellite.

Each of the host computer systems may perform different types of data operations in accordance with different tasks and applications executing on the hosts. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
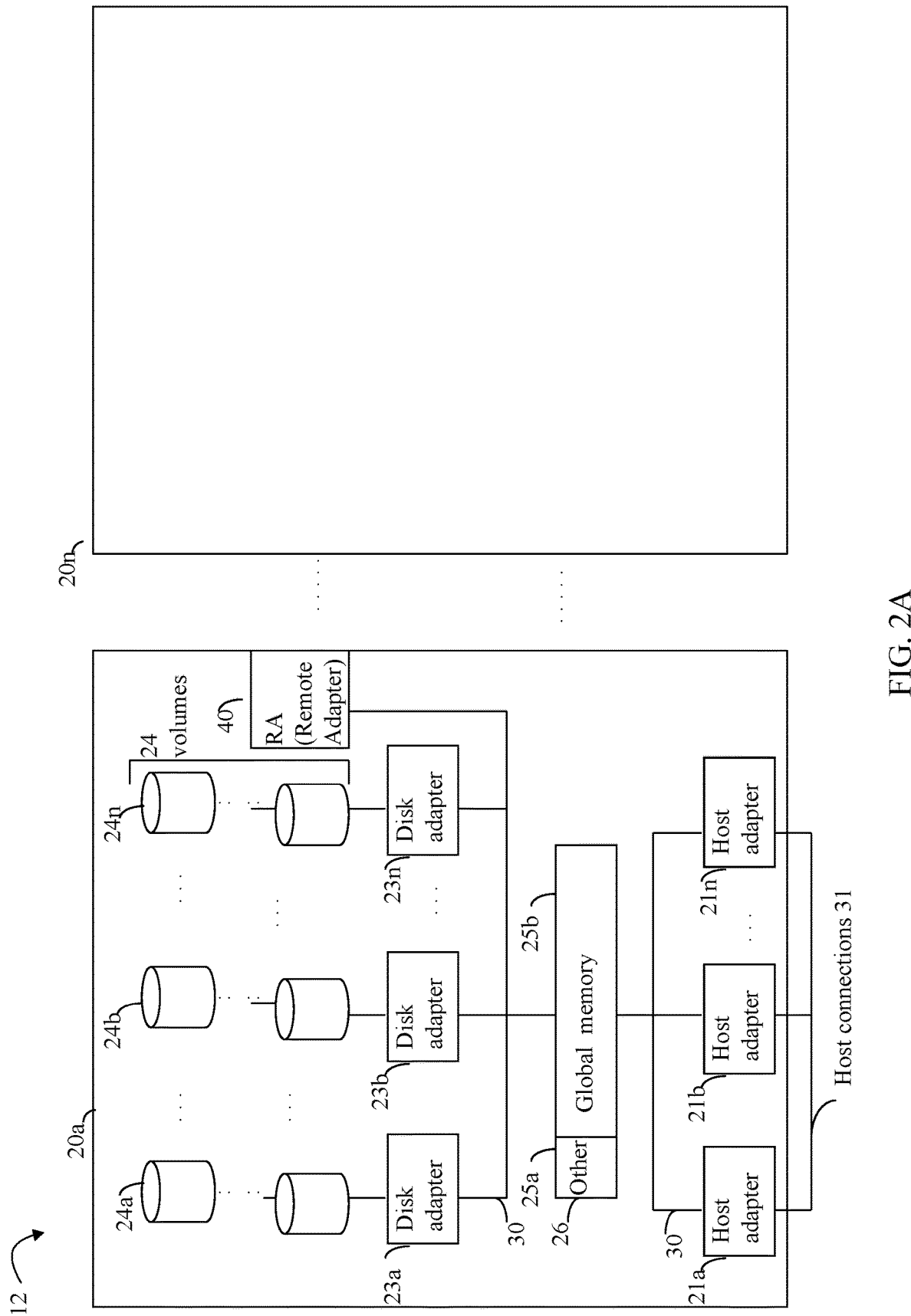
FIG. 2A is an example of an embodiment of a data storage system.

Referring now to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems.

Each of the data storage systems, such as 20a, may include a plurality of data storage devices (e.g., physical non-volatile storage devices), such as disk devices or volumes, in an exemplary arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

Also shown in the storage system 20a is an RA or remote adapter 40. The RA may be hardware including a processor used to facilitate communication between data storage systems, such as between two of the same or different types of data storage systems. In one embodiment described in more detail in following paragraphs and figures, the RAs of the different data storage systems may communicate over a Gigabit Ethernet or Fibre Channel transmission channel supporting messaging traffic between data storage systems. The RA may be hardware including a processor used to facilitate communication between data storage systems, such as between two Symmetrix® data storage systems. The RA may be used with the Symmetrix Remote Data Facility (SRDF®) products provided by Dell Inc. SRDF® is a family of products that facilitates the data replication from one Symmetrix® storage array to another through a Storage Area Network (SAN) or and IP network. SRDF® logically pairs a device or a group of devices from each array and replicates data from one to the other synchronously or asynchronously. Generally, the SRDF® products are one example of commercially available products that may be used to provide functionality of a remote data facility (RDF) for use in an embodiment in connection with techniques herein.

One or more internal logical communication paths may exist between the DA's, the RA's, the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

It should be generally noted that the elements 24a-24n denoting data storage devices may be any suitable storage device such as a rotating disk drive, flash-based storage, and the like. The particular data storage system as described in this embodiment, or a particular device thereof, such as a rotating disk or solid state storage device (e.g., a flash-based storage device), should not be construed as a limitation. Other types of commercially available data storage systems, as well as processors and hardware controlling access to these particular devices, may also be included in an embodiment.

In at least one embodiment, write data received at the data storage system from a host or other client may be initially written to cache memory (e.g., such as may be included in the component designated as 25b) and marked as write pending. Once written to cache, the host may be notified that the write operation has completed. At a later point time, the write data may be destaged from cache to the physical storage device, such as by a DA.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices, logical volumes or logical units (LUNs). The LUNs may or may not correspond to the actual disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

Figure 2B:
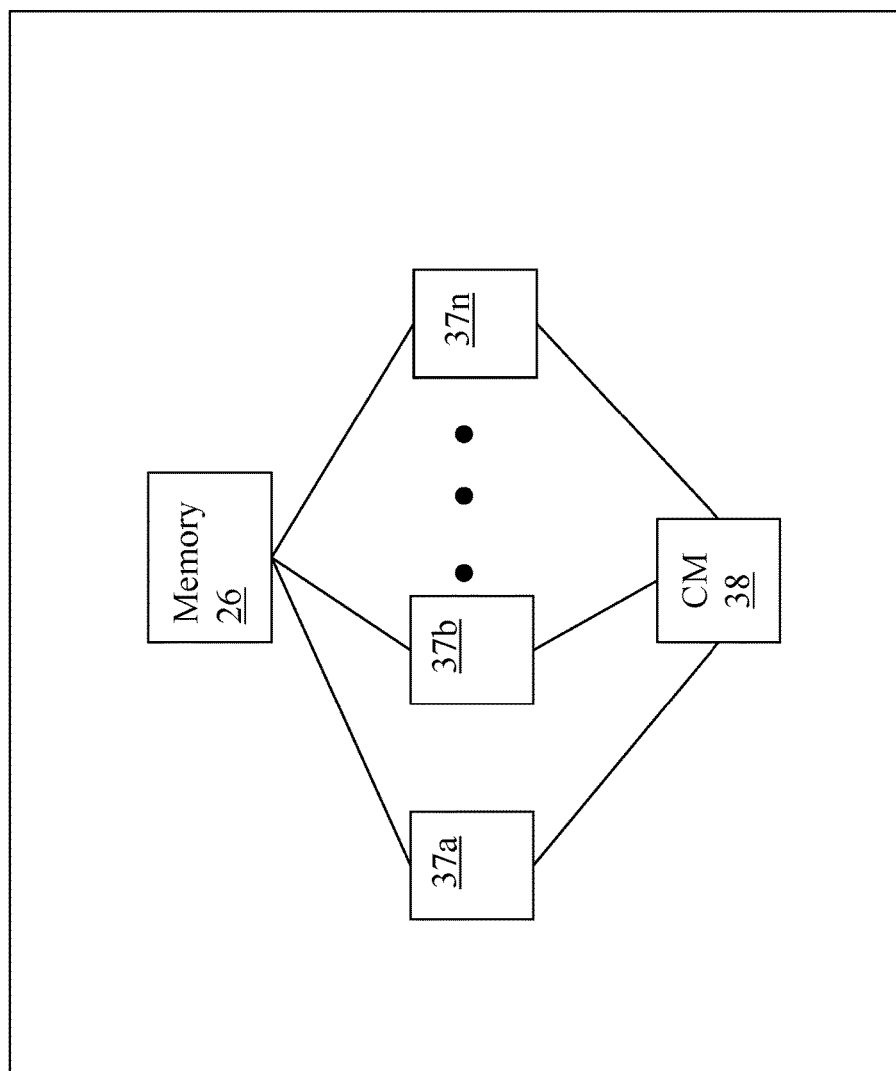
FIG. 2B is a representation of the logical internal communications between the directors and memory included in one embodiment of the data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

Figure 3:
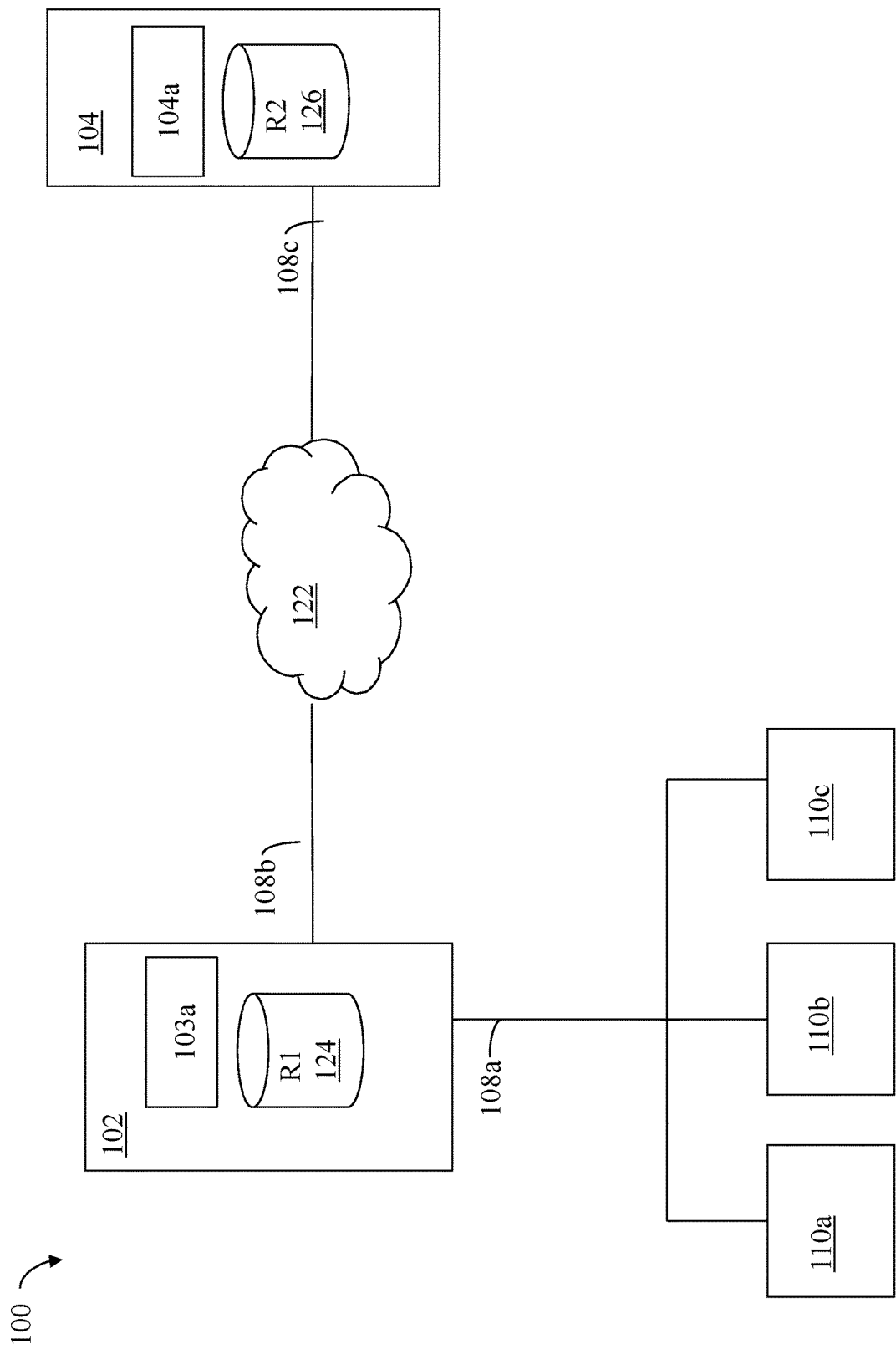
FIGS. 3 and 4 are example representations of components of a system that may be used in connection with the techniques herein.

Referring to FIG. 3, shown is an example of an embodiment of a system 100 that may be used in connection with the techniques described herein. It should be noted that the embodiment illustrated in FIG. 3 presents a simplified view of some of the components illustrated in FIGS. 1 and 2A, for example, including only some detail of the data storage systems 20a through 20n for the sake of illustration.

Included in the system 100 are data storage systems 102 and 104 and hosts 110a, 110b and 110c. The data storage systems 102, 104 may be remotely connected and communicate over network 122, such as the Internet or other private network, and facilitate communications with the components connected thereto. Hosts 110a, 110b and 110c may perform operations to data storage system 102 over connection 108a. The hosts 110a, 110b and 110c may be connected to the data storage system 102 through connection 108a which may be, for example, network or other type of communication connection. Although not illustrated, the hosts 110a-110c may also be directly connected to a network such as the Internet.

The data storage systems 102 and 104 may include one or more devices. In this example, data storage system 102 includes device R1 124, and data storage system 104 includes device R2 126. Both of the data storage systems 102, 104 may include one or more other logical and/or physical devices. Data storage system 102 may be characterized as local with respect to hosts 110a, 110b and 110c. Data storage system 104 may be characterized as remote with respect to hosts 110a, 110b and 110c. For example, in some embodiments in accordance with techniques herein, the distance between the data storage systems 102 and 104 may be 200 km or more.

The host 110a may issue a command, such as to write data to device R1 of data storage system 102. In some instances, it may be desirable to copy data from the storage device R1 to another second storage device, such as R2, provided in a different location so that if a disaster occurs that renders R1 inoperable, the host (or another host) may resume operation using the data of R2. Such a capability is provided, for example, by the SRDF® products provided by Dell Inc. Data storage device communication between Symmetrix™ data storage systems using SRDF® is described, for example, in U.S. Pat. Nos. 5,742,792, 5,544,347, and 7,054,883, all of which are incorporated by reference herein. With SRDF®, a user may denote a first storage device, such as R1, as a master storage device and a second storage device, such as R2, as a slave storage device. Other incarnations of SRDF® may provide a peer to peer relationship between the local and remote storage devices. In this example, the host 110a interacts directly with the device R1 of data storage system 102, but any data changes made are automatically provided to the R2 device of data storage system 104 using SRDF®. In operation, the host 110a may read and write data using the R1 volume in 102, and SRDF® may handle the automatic copying and updating of data from R1 to R2 in data storage system 104.

As illustrated in connection with other figures herein, data storage system 102 may have one or more RAs included therein to facilitate remote connections to the data storage system 104. Communications between storage system 102 and 104 may be made over connections 108b,108c to network 122. Data storage system 104 may include one or more RAs for use in receiving the communications from the data storage system 102. The data storage systems may communicate, for example, over Gigabit Ethernet connections supporting TCP/IP traffic. The SRDF® replication functionality may be facilitated with the RAs provided at each of the data storage systems 102 and 104. Performing remote data communications using SRDF® over a TCP/IP network is described in more detail in U.S. Pat. No. 6,968,369, Nov. 22, 2005, Veprinsky, et al., REMOTE DATA FACILITY OVER AN IP NETWORK, which is incorporated by reference herein. In connection with SRDF®, a single RDF link or path may be between an RA of the system 102 and an RA of the system 104. As described in more detail below, techniques are described for use in transmitting data over an RDF link, such as I/O traffic including write data in connection with performing remote data replication over the RDF link between the systems 102 and 104.

An embodiment may also include the concept of a remote data facility (RDF) group in which one or more devices on a data storage system are associated with a particular group under the control of a single RA which services the devices included therein. Rather than have a single R1 device and a single R2 device, a grouping may be defined so that a source group of devices, such as on data storage system 102, have corresponding target devices of a target group, such as devices on data storage system 104. Devices in a source group may be mirrored in corresponding devices of a target group using SRDF® functionality.

Techniques herein may be used with SRDF®, or more generally any RDF, operating in one or more different supported modes. For example, such modes may include SRDF® operating in synchronous mode, asynchronous mode, or adaptive copy mode. For example, in connection with SRDF®, one of the hosts 110*a-c* may issue a write to an R1 device in a first data storage system and the data change is propagated to the R2 device in a second data storage system. As discussed in U.S. Pat. No. 5,544,347, SRDF® can be operated in either a synchronous mode or an asynchronous mode. When operating in the synchronous mode, the host does not consider an operation specified by a command chain to be completed until the command chain has been committed to both the first and second data storage systems. Thus, in synchronous mode, the first or source storage system will not provide an indication to the host that the data operation is complete until the first storage system receives an acknowledgement from the second data storage system regarding the data for the R2 device. In contrast, in connection with the asynchronous mode, the host receives an acknowledgement from the first data storage system as soon as the information is committed to the first data storage system without waiting for an acknowledgement from the second data storage system.

In at least one embodiment performing data replication operating in the asynchronous replication mode, an acknowledgement regarding completion of a host write from one of the hosts 110*a-c* may be sent to the host from the first data storage system 102 once the write data has been written to the data cache 103*a* on the system 102. Consistent with discussion elsewhere herein, the write data is subsequently destaged from 103*a* to physical storage provisioned for the R1 device 124. Additionally, the write data is also transferred to the second data storage system 104 where the write data is then written to the data cache 104*a*, and acknowledgement is returned from system 104 to 102, and subsequently the write data is destaged from 104*a* to physical storage provisioned for the R2 device 126.

In at least one embodiment performing data replication operating in the synchronous replication mode, the first data storage system 102 receives a write I/O operation from one of the hosts 110*a-c*. The system 102 stores the write data in its data cache 103*a*. Consistent with discussion elsewhere herein, the write data is subsequently destaged from 103*a* to physical storage provisioned for the R1 device 124. Additionally, the write data is also transferred to the second data storage system 104, where the write data is then written to the data cache 104*a*, an acknowledgement is returned from system 104 to 102, and subsequently the write data is destaged from 104*a* to physical storage provisioned for the R2 device 126. The second data storage system 104 sends an acknowledgement to system 102 acknowledging receipt of the write data once the write data has been written to the data cache 104*a* of the system 104. The first data storage system 102 returns an acknowledgement to the host that sent the write I/O operation once the system 102 receives the acknowledgement from the system 104 regarding the write data.

Depending on the physical distance between the data storage systems 102, 104, it may be desirable to operate in a mode such as asynchronous to avoid host timeouts while the host awaits acknowledgement regarding completion of a host I/O.

Described in following paragraphs are techniques that may be used in connection with performing data replication with any suitable mode, such as asynchronous as well as synchronous and other suitable replication modes that may be operable with the particular RDF utilized in an embodiment in accordance with techniques herein.

Each time period for which writes are collected or captured may also be referred to as a cycle or delta set having an associated cycle or sequence number. Thus, writes directed to an R1 device may be collected for cycle 1, cycle 2, and the like, whereby the sequence or cycle number denotes the particular time period in a sequence of successive time periods for which writes are collected. In an embodiment in accordance with techniques herein, dependent write consistency may be provided by processing and preserving all writes to the destination R2 system in ordered sequential numbered sets. In this manner, the writes of each cycle may be applied in a sequential ordering to the R2 device based on the cycle or sequence number associated with each cycle of writes. Dependent write consistency refers to the maintenance of consistent replica data between the R1 source device and R2 destination device.

In one embodiment, writes collected within the same single cycle (e.g., writes having the same sequence or cycle number) may be applied in any order to the R2 device whereby such writes may be characterized as being write order independent. As writes during a time period or cycle are recorded, additional processing may be performed to obtain a final set of write operations actually transmitted from the R1 to the R2 data storage system whereby such writes in the final set are write order independent. For example, write folding may be performed for writes in a single capture cycle whereby if a single portion of data is updated multiple times, only the final or most recent data update is actually included in the final set transmitted to the R2 system. Since consistency is maintained between cycles, if replication stops, processing is performed to ensure that either a fully received cycle of write data is applied to the R2 device, or is otherwise discarded.

In one embodiment, a write may be included in a particular cycle if processing of the write operation has commenced within the time period of that particular cycle.

For each collection or cycle N of write data directed to the R1 device having an associated sequence number, processing may include a data collection or capture phase, a transmit or transmission phase, a receive phase and a restore or apply phase. Generally, writes are collected for a time period or a particular cycle in a capture phase on the R1 system, SRDF®/A transfers a cycle of data in the transmit phase from the R1 system to the R2 system, the receive phase on the R2 system receives data from the transmit phase, and the apply or restore phase with respect to a particular cycle refers to applying the cycle of data to the R2 device.

Figure 4:
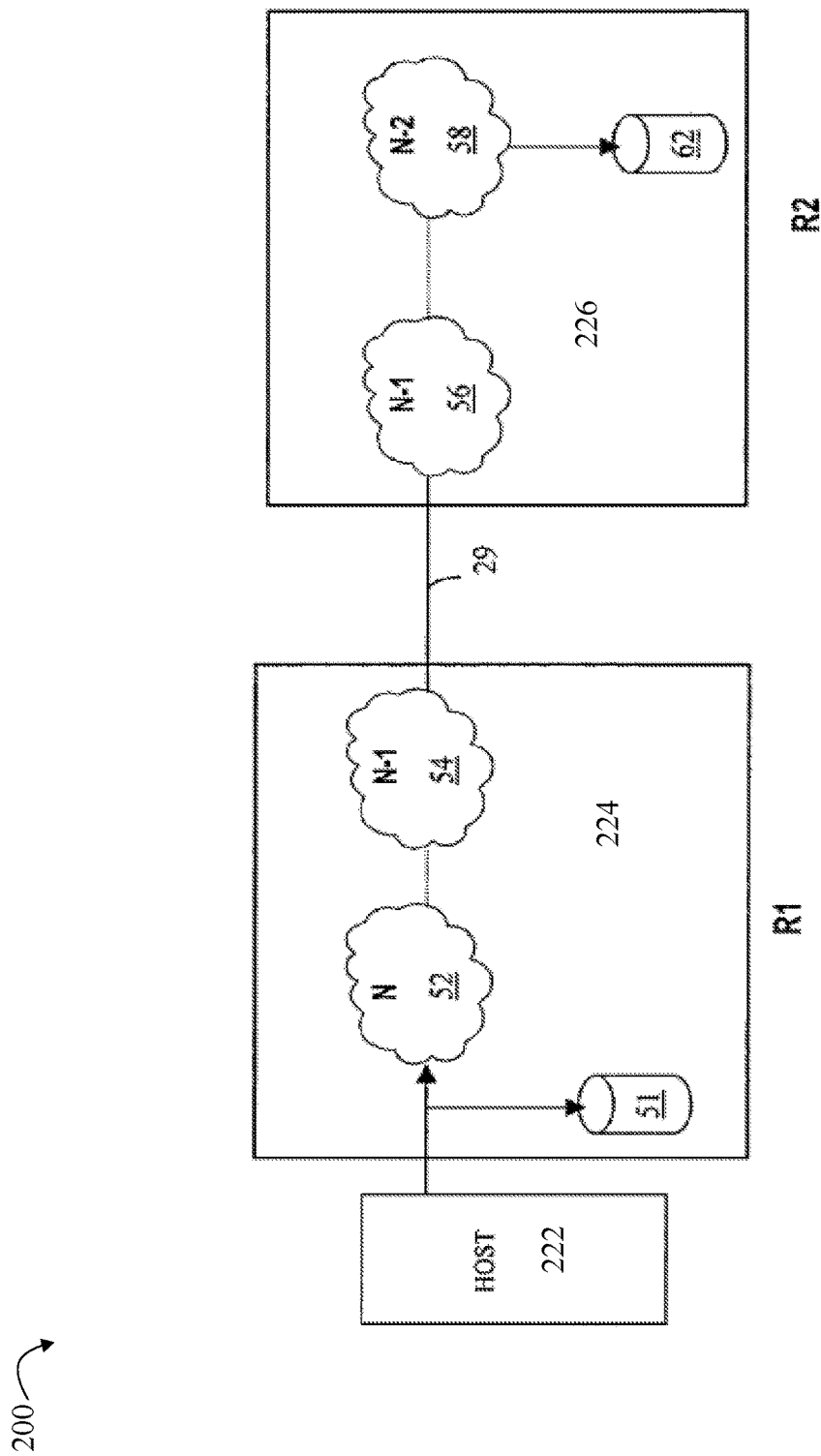

Referring to FIG. 4, a path of data is illustrated from the host 222 to the local R1 storage system 224 and the remote R2 storage system 226. Data written from the host 22 to the local storage system 225 is stored locally, as illustrated by the storage device 51. The data that is written by the host 222 to the local storage system 224 is also maintained by the local storage system 224 in connection with being sent by the local storage system 224 to the remote storage system 226 via the link 29.

In FIG. 4, the writes by the host 222 collected or captured for cycle N are shown as being assigned sequence number N, where N may be greater than zero in a system where the first cycle is denoted by 1. All of the writes performed by the host 22 that are assigned sequence number N are collected in a single cycle or collection of write data 52. The single cycle of write data 52 represents a plurality of separate writes by the host 22 that occur during a single collection cycle or time period.

Generally, the local storage system 224 accumulates writes of one sequence number or collection while transmitting a previously accumulated collection (having the previous sequence number) to the remote storage system 226. Thus, while the local storage system 224 is accumulating writes from the host 222 that are assigned sequence number N, the writes that occurred for the previous sequence number (N−1) are transmitted by the local storage system 224 to the remote storage system 226 via the link 29. A collection or cycle of writes 54 represents writes from the host 22 that were assigned the sequence number N−1 that have not been transmitted yet to the remote storage system 226.

The remote storage system 226 receives the data from the cycle or collection of writes 54 corresponding to writes assigned a sequence number N−1 and constructs a new cycle or collection 56 of host writes having sequence number N−1. The data may be transmitted using appropriate RDF protocol that acknowledges data sent across the link 29. When the remote storage system 226 has received all of the data from the cycle or collection 54, the local storage system 224 sends a commit message to the remote storage system 226 to commit all the data assigned the N−1 sequence number corresponding to the cycle or collection 56. Thus, sending the commit message by the R1 system to the R2 system indicates that all data of the cycle, such as cycle N−1, being transmitted has completed. Generally, once a collection or cycle of writes corresponding to a particular sequence number is committed, that collection or cycle of writes may be written to the logical storage device. This is illustrated in FIG. 4 with a collection 58 corresponding to writes assigned sequence number N−2 (i.e., two before the current sequence number being used in connection with writes by the host 222 to the local storage system 26). In FIG. 4, the collection or cycle 58 is shown as being written to a storage device 62 representing disk storage for the remote R2 device logically paired with R1 device 51 whereby processing is performed to replicate data of R1 device 51 on R2 device 62. Thus, the remote R2 storage system 226 is receiving and accumulating the collection of writes 56 corresponding to sequence number N−1 while the collection of writes 58 corresponding to the previous sequence number (N−2) is being written to disk storage 62 of the remote storage system 226. In some embodiments, the data for the collection 58 is marked for write (but not necessarily written immediately to the physical storage medium or storage device), while the data for the collection 56 is not (e.g. may be stored in cache or other memory buffer).

Thus, in operation, the host 22 writes data to the local storage system 224 that is stored locally in the R2 device 51 and is accumulated in the collection of writes 52. Once all of the data for a particular sequence number has been accumulated (described elsewhere herein), the local storage system 224 increments the sequence number. Data from the collection of writes 54 corresponding to one less than the current sequence number is transferred from the local storage system 224 to the remote storage system 226 via the link 29. The collection of writes 58 corresponds to data for a sequence number that was committed by the local storage system 224 sending a message to the remote storage system 226. Data from the collection 58 is written to the R2 storage device 62.

Note that the writes within a particular one of the collections 52, 54, 56, 58 are not necessarily ordered. However, as described in more detail elsewhere herein, every write for the collection 58 corresponding to sequence number N−2 was begun prior to beginning any of the writes for the collections 54, 56 corresponding to sequence number N−1. In addition, every write for the collections 54, 56 corresponding to sequence number N−1 was begun prior to beginning any of the writes for the collection 52 corresponding to sequence number N. Thus, in the event of a communication failure between the local storage device 24 and the remote storage device 26, the remote storage device 26 may simply finish writing the last committed collection of data (the collection 58 in the example of FIG. 4) and can be assured that the state of the data at the remote storage system 226 is ordered in the sense that the storage device 62 contains all of the writes that were begun prior to a certain point in time and contains no writes that were begun after that point in time. Thus, the R2 device, such as represented by element 62, always contains a point in time copy of R1 and it is possible to reestablish a consistent image from the R2 device.

In at least one embodiment with reference to FIG. 4, while capture is performed for writes of cycle N (e.g., element 52), the transmit phase (e.g., element 54) and receive phase (e.g., element 56) may be performed with respect to writes of cycle N−1 and the restore or apply phase (e.g., element 58) may be performed with respect to writes of cycle N−2. In such a system, the R1 system may send a commit message (regarding cycle N−1 write data) to the R2 system when the R1 system has completed transmitting all the cycle N−1 write data. The R2 system may send an acknowledgement regarding cycle N−1 to the R1 system when all the cycle N−1 write data has been received at R2 and when R2 has also completed applying the writes of cycle N−2 to the R2 device.

The time that elapses from when a host 222 issues an I/O operation to the local data storage system 224 and when the I/O completes is experienced as I/O latency by the host. Thus, for example with reference to a system using RDF for remote replication operating in synchronous mode, the I/O latency is greater than when operating in asynchronous mode due to the additional time the elapses prior to the local data storage system 224 returning an acknowledgement regarding completion of the write to the host. Generally, I/O latency is an important performance consideration with regard to data replication techniques. Some systems may perform data compression in connection with replication. For example, the write data being transferred from system 224 to system 226 may be compressed prior to transmission over a network connection 29 in order to reduce network bandwidth consumption, to increase overall throughput of the host write data and also reduce the I/O latency in connection with performing replication. However, such compression techniques that may be utilized have drawbacks. Existing software compression/decompression techniques tend to be highly CPU intensive and thus may consume undesirable amounts of CPU cycles. Furthermore, software compression/decompression may contribute to the higher than desirable I/O latency due to the additional amount of time required to perform such operations. Thus, in one aspect, software compression may provide a benefit by consuming less network bandwidth for data transfer between system 224 and 226. However, one added drawback is the additional CPU resources consumed by the data storage system 224, 226 thereby contributing to possibly increased I/O latency. Data compression may also be performed in hardware such as using a hardware compression device for compression/decompression operations. However, hardware compression also has drawbacks by requiring use of the special hardware compression device on both the systems 224 and 226 for the particular compression technique performed. However, the startup overhead associated with the hardware compression programming (e.g., pinning the source and destination buffers, posting the descriptors, and checking for completion notifications) introduces additional latency to the I/O operations. The hardware compression device may also be also responsible for handling back-end compression for writing the compressed data onto the physical storage devices whereby the hardware device may be a resource of contention that is overloaded by demands needed for back-end compression as well as compression required for compressing the write data for RDF transfer.

Described in following paragraphs are techniques that may be used in connection with performing replication where such techniques overcome drawbacks, such as increased I/O latency, otherwise incurred with compression techniques. Techniques described in following paragraphs apply data deduplication techniques to the replication or write data transmitted from the local system 224 to the remote system 226. In at least one embodiment, the data deduplication applied to the replication or write data may be applied to the one or more collections, cycles or sequences of collected write data 52 and 54 transferred from local system 224 to remote system 226. In at least one embodiment, processing on system 224 may be performed on the collected write data whereby chunks or portions of write data that are redundant are replaced with a reference to a single unique instance or copy of the data before transfer from system 224 to 226 over network connection 29. For example, in at least one embodiment, every redundant or identical 512 byte block of write data payload may be replaced with a single byte reference to the single unique instance or copy of the data. As described in following paragraphs, at least one embodiment of the techniques herein utilize a binary search tree (BST) to reference the identical data blocks thereby providing effective insertion and search time complexities of O (log n). Although following description may use for purposes of illustration a particular block size, techniques herein may be readily extended and applied for use with any suitable block size. The foregoing and other aspects of techniques herein are set forth in more detail in following paragraphs.

Figure 5:
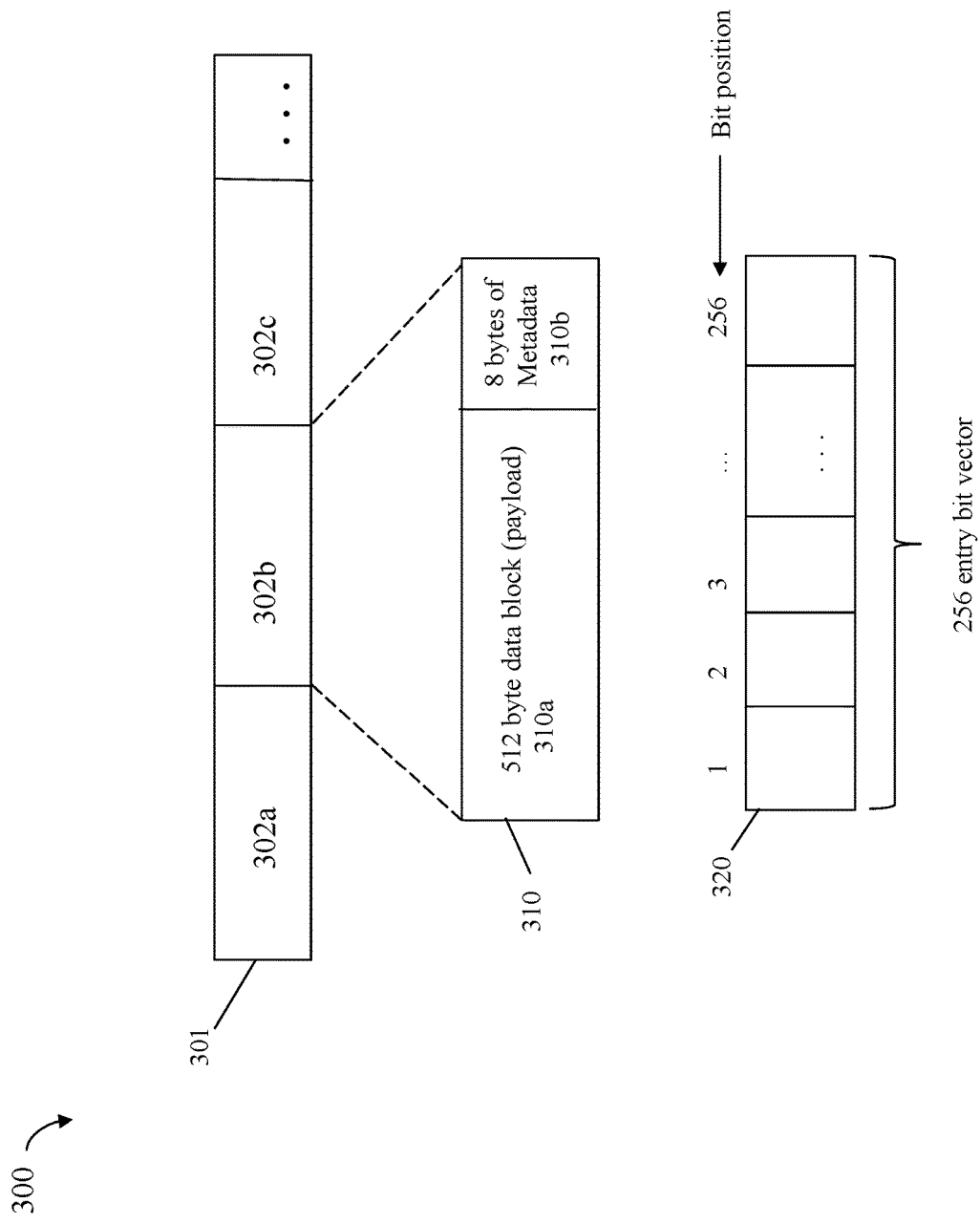
FIG. 5 is an example of write data and associated data structures that may be used in an embodiment in accordance with techniques herein.

Referring to FIG. 5, shown is an example 300 illustrating write data of a host write I/O operation in an embodiment in accordance with techniques herein. Generally, an embodiment may partition each host write operation (e.g., write data or write I/O payload) into one or more data chunks or blocks. In at least one embodiment, the size of each data block or chunk may be the same size, such as 512 bytes of write data or payload. Additionally, associated with each data block or chunk of write data may be metadata used to generally describe that particular data block or chunk. Such metadata may include, for example, correction or error code information used in connection with validating the particular data block such as in connection with validating and verifying the integrity of the data block (e.g., that the data block was successfully transferred without corruption or modification from the local system 224 to the remote system 226).

The example 300 illustrates write data of a host write I/O operation that has been partitioned into 512 byte blocks each associated with its own 8 bytes of metadata. In the example 300, element 302a denotes a first data block and its associated block-level metadata, element 302b denotes a second data block and its associated block-level metadata, and element 302c denotes a third data block and its associated block-level metadata. Generally, the write data is partitioned into a suitable number of data blocks with associated per block block-level metadata in accordance with the amount or size of the write I/O operation data (e.g., size of the write data payload or data being written). Thus, element 301 may collectively represent the result after partitioning a single host write I/O operation into multiple 512 byte data blocks and additionally creating and associated per-block metadata with each such data block.

Element 310 illustrates in more detail portion 302b although each other portion of the example 300 may be similar to that as illustrated by 310. In 310, the portion 302b includes a 512 byte data block or payload 310a and its associated 8 bytes of metadata 310b. Generally, particular sizes are used herein for purposes of illustration. However, such techniques herein may be used in connection with any suitable sizes and are not limited by those provided herein for illustration.

In at least one embodiment, the maximum data or payload size of any host I/O may be a single track of 128 KB. In such an embodiment, the maximum number of 512 byte data blocks of a single write I/O operation (maximum number of write data blocks or payload) is 256. Thus, an embodiment may allocate suitable buffers, other memory, and structures for use with techniques herein to accommodate the maximum number of 256 portions (e.g., 256 512-byte data blocks and associated metadata).

The example 300 also illustrates structure 320 for use with techniques herein. The structure 320 may be a bit vector including a unique bit position for each of the possible 256 data blocks for a single write I/O operation. The bit positions are numbered 1 through 256, inclusively, as denoted in connection with the structure 320. The structure 320 may also be referred to herein as the deduplication bit vector including metadata header information for the single host write I/O operation. Thus, in addition to each data block (e.g., 310a) including its own block-local metadata (e.g., 310b), additional write I/O metadata 320 may be associated collectively with all data blocks and portions 301 of a single host write I/O operation having its data transmitted from local system 224 to remote system 226.

Generally, processing described in following paragraphs is performed to initialize the structure or deduplication bit vector 320. Each of the 512 data blocks of the single host write I/O operations is associated with a different corresponding one of the bit positions. Collectively, 301 denotes the sequence or consecutive positions of the data blocks in the host write I/O operation. Thus, for example, portion 302a includes the first 512-byte data block of the write, portion 302b includes the second 512-byte data block of the write, portion 302c includes the third 512-byte data block of the write, and so on, for subsequent data blocks of the single host write I/O operation. The first 512-byte data block of 302a has a corresponding bit position 1 in the bit vector 320. The second 512-byte data block of 302b has a corresponding bit position 2 in the bit vector 320. The third 512-byte data block of 302c has a corresponding bit position 3 in the bit vector 320. Similarly each subsequent data block of a portion in 301 also has a corresponding bit position in vector 320. Based on the foregoing, there is a defined ordering or position of the 512-byte data blocks in the write data payload where such ordering or position of each of the data blocks has a corresponding unique position in the bit vector 320.

The deduplication bit vector 320 may be initialized for use with techniques herein as follows. For a data block i having a corresponding bit position i in the vector 320, its corresponding bit position i is set to 1 if the data block i has been deduplicated in the final representation of the host write I/O to be transmitted from local system 224 to remote system 226 includes the actual; and otherwise the bit position i is set to 0. Put another way, a bit position i for data block i is set to:

0 if the final representation of the host write I/O to be transmitted from local system 224 to remote system 226 includes the actual data block thereby indicating that this is the first unique instance of the data block in the write I/O data; or 1 if the final representation of the host write I/O to be transmitted from local system 224 to remote system 226 includes a pointer, token or other identifier representing or referencing the unique instance of the data block in the final representation.

For a data block i having a corresponding bit position i in the vector 320 set to 1, it means that the data block i is a redundant or duplicate data block D and a previous instance of the same data block D is located at another position k, whereby data block position k occurs prior to i in the final representation of the host write I/O. For instance, if the deduplication bit vector 320 is as follows:

| Bit position | |
|---|---|
| 1 | 0 |
| 2 | 0 |
| 3 | 0 |
| 4 | 1 |
| 5 | 1 |
| 6 | 1 |
| 7 | 1 |
| 8 | 0 |
| 9 | 0 |
| 10 | 0 | it means the first, second third, eighth, ninth and tenth data blocks as included in the final host write I/O representation to be transmitted are unique; and the fourth, fifth, sixth, and seventh data blocks as included in the final host write I/O representation to be transmitted are redundant. In such a case, the final host write I/O representation does not include the actual redundant copies of the data blocks for fourth, fifth, sixth, and seventh data block instances. Rather, the final host write I/O representation includes a reference to the actual single unique data block instance (e.g., identifies the location in the final representation of the actual single unique data block instance). Initialization and use of structure or deduplication bit vector 320 in connection with techniques herein is described in more detail in following paragraphs.

Figure 6:
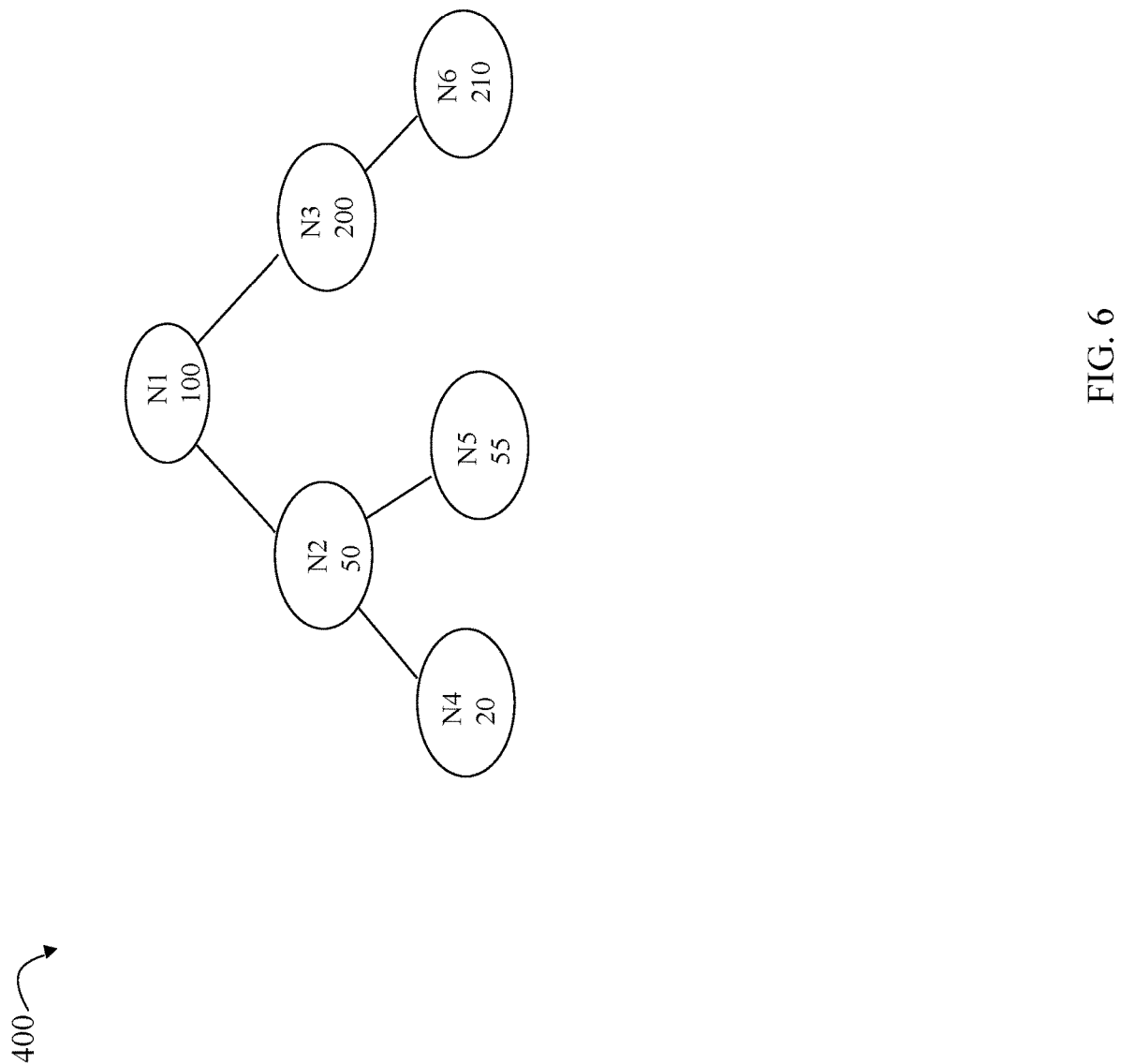
FIG. 6 is an example of a binary search tree that may be used in an embodiment in accordance with techniques herein.

In at least one embodiment in accordance with techniques herein, a BST may be used as the data structure to store the data blocks of the host write I/O operation thereby allowing for fast lookup, deletion and removal of items from the BST. Generally, BST data structures are known in the art. A binary tree is a structure with levels of nodes forming a tree structure. As a binary tree, each parent node in the tree has at most two child nodes. As a search tree, the binary tree is organized based on a key value associated with each node. The binary tree used as a search tree has the additional property that, for a parent node in the tree, all its descendant nodes in the right subtree have key values greater than the parent node's key value, and its descendant nodes in the left subtree are less than the parent node's key value. To further illustrate the foregoing, reference is made to the example 400 of FIG. 6 illustrating an example of a BST. The example 400 includes 6 nodes N1 through N6 having the following key values: N1=100, N2=50, N3=200, N4=20, N5=55 and N6=210. N1 having a key value of 100 is the root node of the tree having a left child node N2 and right child node N3, whereby the key value for N2=50 is less than 100, and the key value for N3 is more than 100. As can be seen, the BST maintains the property that all descendant nodes (N3, N6) in the right subtree of N1 have associated key values (200, 210) greater than N1's key value of 100; and all descendant nodes (N2, N4, N5) in the left subtree of N1 have associated key values (50, 20, 55) less than N1's key value of 100. A node is inserted into the tree of 400 in a position maintaining the general properties of binary search trees regarding any right child node of a parent node having a key value that is greater than the parent node's key value. Similarly, any left child node of the parent node has a key value that is less than the parent node's key value. In connection with techniques herein, if a node being inserted into the BST is a duplicate of an existing node in the BST, the node is not again inserted into the tree. Rather, other processing as described below may be performed for use with data deduplication.

In an embodiment in accordance with techniques herein, each node of the BST has an associated key value used as described above as the key used for maintaining the BST properties for organizing the nodes within the binary tree. Additionally, each node is also associated with a data value denoting the actual data block represented by a particular key value or node in the tree. The key values used may represent the position of data block in the single host write I/O. For example, consistent with discussion elsewhere herein, a key value of 2 represents the second 512-byte data block in the host write I/O operation. Thus, a node in the tree have a key value of 2 represents the second 512-byte data block in the host write I/O operation. In the BST structure, the node may be a structure including a integer as the key value with a pointer or other reference to the buffer, memory, or other location where the second 512-byte data block is stored. In this manner, the BST may denote the deduplication structure including the single unique instances of each data block in the host write I/O operation.

Generally, techniques herein process host I/O write operations having data to be transferred from the local data storage system 224 to the remote data storage system 226 as part of replication processing performed by RDF. Such processing performed by the local data storage system 224 includes deduplicating redundant data blocks to unique instances of data blocks and references to the unique data blocks. Such processing may be performed by system 224 in connection with egress or outbound processing of write data transmitted from system 224 to system 226. In turn, the remote system 226 receiving the deduplicated host write I/O operation also performs processing to unwrap or restore the deduplicated write data to its original data block form on the ingress/inbound processing. Data deduplication is known in the art and generally refers to removing redundant or duplicate data whereby only a single instance of the data block or chunk is retained with pointers or references used in connection with duplicate or redundant copies (which reference or identify the single instance of the data block).

The processing performed on the systems 224 and 226 in an embodiment in accordance with techniques herein is described in more detail below with reference to a particular example. Generally, write data of a host write I/O operation may be received by the local or R1 data storage system. The write I/O operation is a write directed to the R1 device of a configured R1-R2 device pairing such as illustrated in connection with FIGS. 3 and 4 described elsewhere herein. Processing will be described below as performed on the local or R1 data storage system for the write data to be transmitted for replication on the corresponding R2 device of the remote or R2 data storage system. Additionally, processing will be described below as performed on the R2 or remote data storage system to apply the received write data to the R2 device.

On the local or R1 data storage system, the write data is partitioned into data blocks, such as 512 byte data blocks. Each data block in the write operation is traversed. During such traversal, a BST is constructed including a node for each unique or single instance of a data block. If a redundant or duplicate data block is traversed which matches a data block of an existing node in the tree, the redundant data block (as included in the final representation of the write data to be transmitted from the local to the remote systems) is replicated with a reference or pointer to the unique single instance of the data block. In this embodiment, the reference is the key value associated with unique single instance of the data block (e.g., position of the unique single instance data block in the write operation).

On the remote or R2 data storage system, the final representation of write data as transmitted from the R1 or local system is received and processed. Such processing on the remote system includes traversing the received representation of the write data and replacing every reference denoting a redundant data block with the actual data block.

The foregoing is described in more detail below with reference to a simple example.

Figure 7:
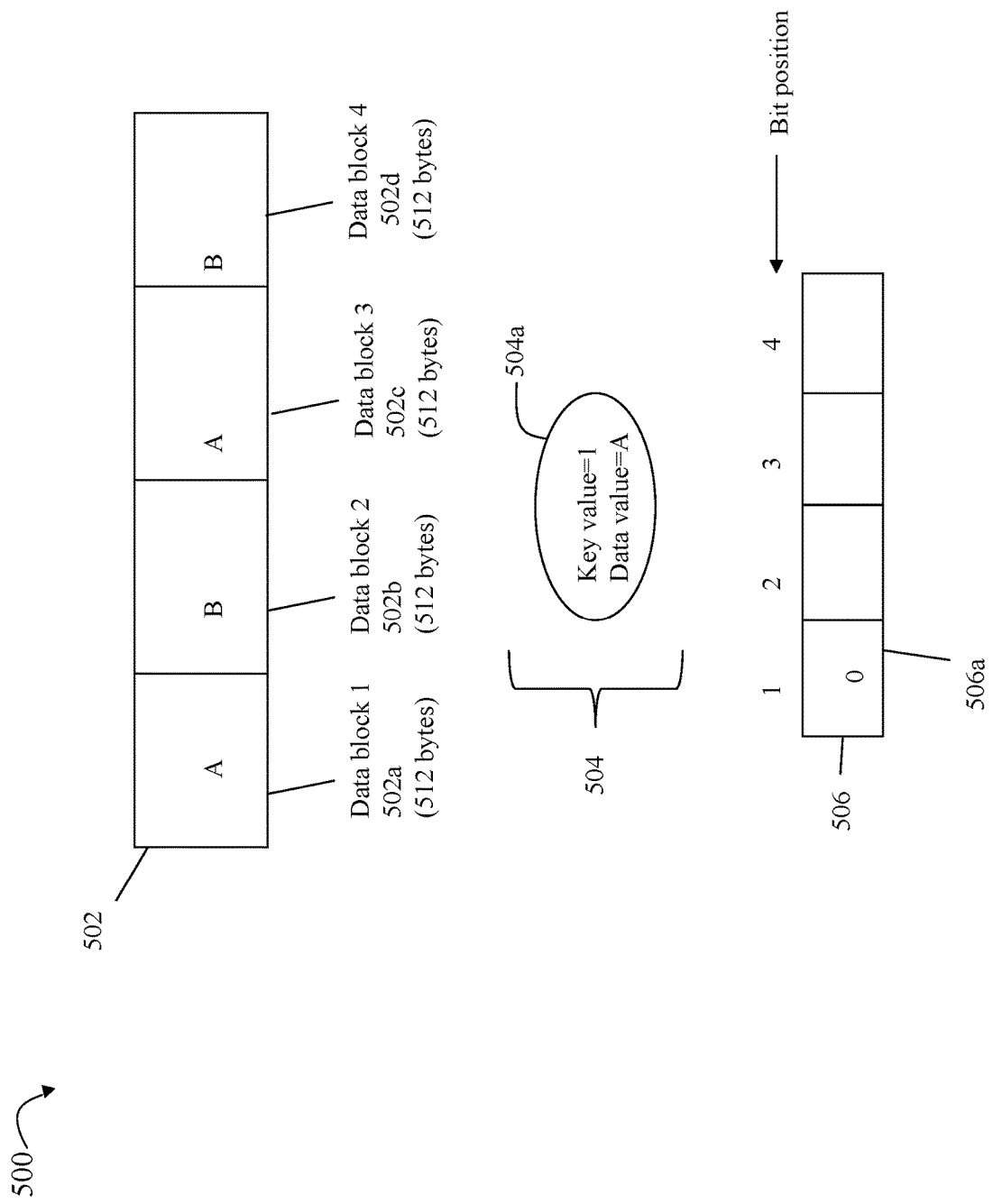
FIGS. 7, 8, 9 and 10 are examples illustrating processing that may be performed on a local data storage system in an embodiment in accordance with techniques herein.

Referring to FIG. 7, shown is an example of write data of a single host write I/O operation in an embodiment in accordance with techniques herein. Element 502 represents the write data or payload of the single host write operation to be written to an R1-R2 RDF configured device pair such as illustrated in connection with FIGS. 3 and 4 and described elsewhere herein. In this example, the size of the write data or payload illustrated by 502 is 2 KB and the number of 512 data blocks for 2 KB I/O operation is 4 (four). On the local or R1 data storage system, the write data 502 to be transmitted to the remote or R2 data storage system may be partitioned into 4 data blocks 502a-502d, each data block being 512 bytes in size. In this example, the write data 502 includes 4 data blocks where the first and third data blocks (502a, 502c) are the same as denoted by "A", and where the second and fourth data blocks (502b, 502d) are the same as denoted by "B". In this example, assume that each data block may be represented by an uppercase alphabetic letter that is any of A through Z. Further assume that the uppercase alphabetic letters denote a predefined relative ordering of 1 through 26, respectively, corresponding to letters A through Z, inclusively. Such an ordering is used in connection with representing and maintaining the BST node properties with respect to stored or represented data values of the BST nodes.

In connection with a first iteration to process the first data block 502a, the BST is initially empty or null whereby the first data block is always unique and inserted as the root of the BST with the key value of 1 as illustrated by element 504.

Element 504 denotes the BST that is built or constructed as the example described progresses through the first iteration of processing performed for data block 502a. Additionally, the deduplication bit vector is updated as illustrated by element 506, whereby bit vector entry 1 506a corresponding to data block 502a is initialized to 0 (zero) to denote the first data block 1 502a is unique and not a duplicate of another preceding data block in the write data. Element 504a denotes the root of the BST with a key value of 1 and a data value of A. Element 504a represents data block 502a as inserted into the BST 504 with a key value=1 (denoting the relative position of the data block in the write data/write I/O operation data 502).

Figure 8:
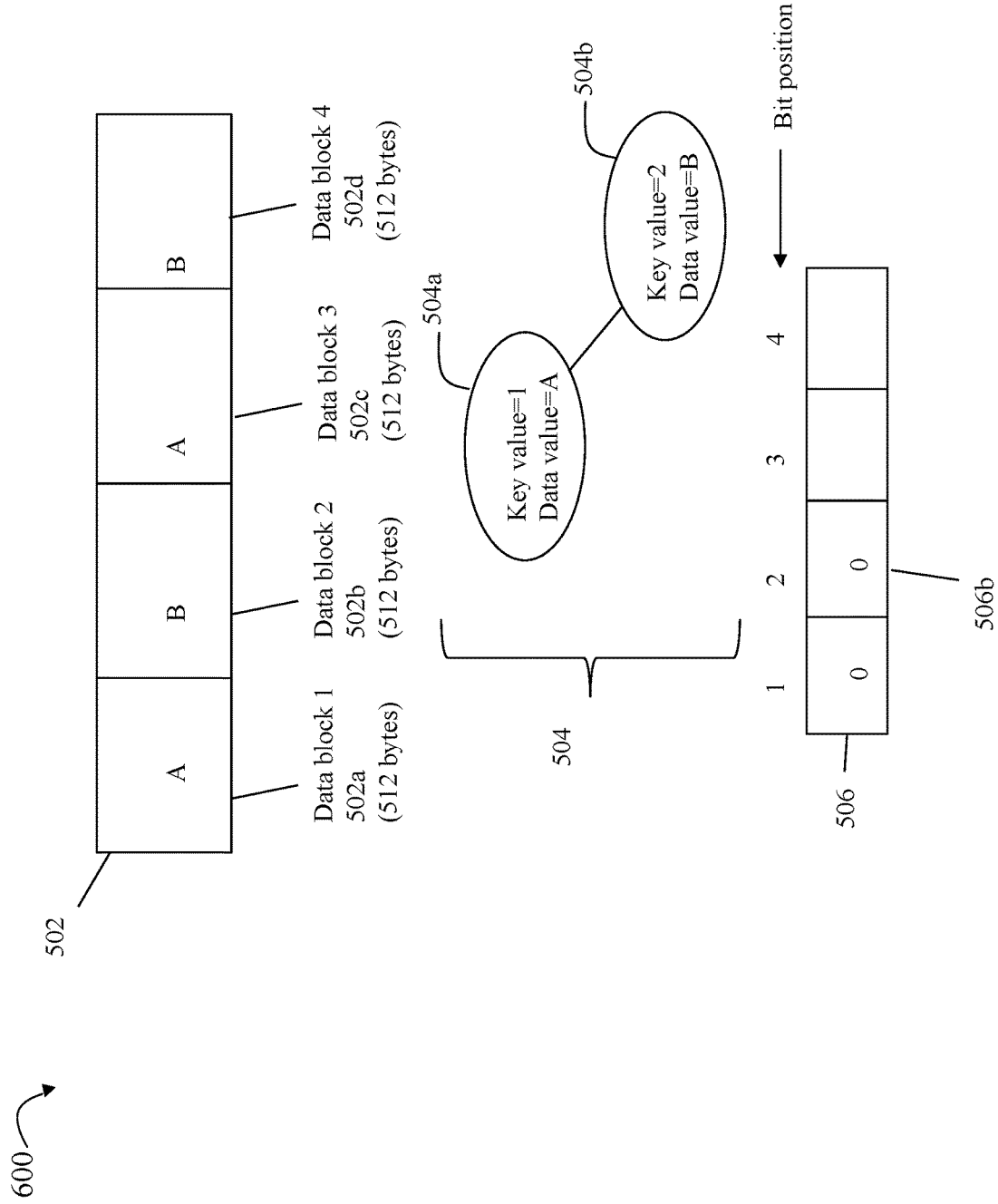

Reference is made to the example 600 of FIG. 8 in connection with a second iteration to process the second data block 502b. The second data block 502b=B is compared to the data pointed by the key values of the elements in BST recursively. If data block 502b matches the data value/block corresponding to an existing node in the BST, the 512 bytes of the current data block 502b are replaced by a single byte reference value which is equal to the key value of the matching existing node as returned by the search operation. If data block 502b does not match any existing node in the BST, it means that the data block 502b is a unique instance of a data block and the data blocks 502b is inserted as a new node into its proper location in the BST in accordance with BST properties as described herein and known in the art. It is noted that insertion, deleting, searching and other operations of BSTs are well known in the art and a portion of such techniques that may be performed in an embodiment are described herein for purposes of illustrating with this example.

In connection with traversing the BST to determine whether data block 502b matches an existing node, the search is performed in accordance with known BST properties. For example, data block 502b "B" may be compared to the data block "A" represented by node 504a. It is determined that data block 502b does not match data block "A" as represented by node 504a. Based on BST properties, each node in the right subtree of 504a has an associated data value that is greater than the data value "A" represented by node 504a; and each node in the left subtree of node 504b has an associated data value that is greater than the data value "A" represented by node 504a. In this example, there are no additional nodes in the BST 504 so no recursive searching of left and/or right subtrees of 504a is needed. It is determined that data block 502b=B does not match any existing node in the BST 504 and a new node represented data block 502b=B is inserted into the BST 504. In connection with data block 502b=B, B is greater than A (node 504a) so a new node 504b is inserted as a right child node of 504a as illustrated since data value "B" (502b) is greater than data value "A" (502a as represented by 504a).

Additionally, the deduplication bit vector is updated as illustrated by element 506, whereby bit vector entry 2 506b corresponding to data block 502b is initialized to 0 (zero) to denote the second data block 2 502b is unique and not a duplicate of another preceding data block in the write data. Element 504b represents data block 502b as inserted into the BST 504 with a key value=2 (denoting the relative position of the data block in the write data/write I/O operation data 502).

Figure 9:
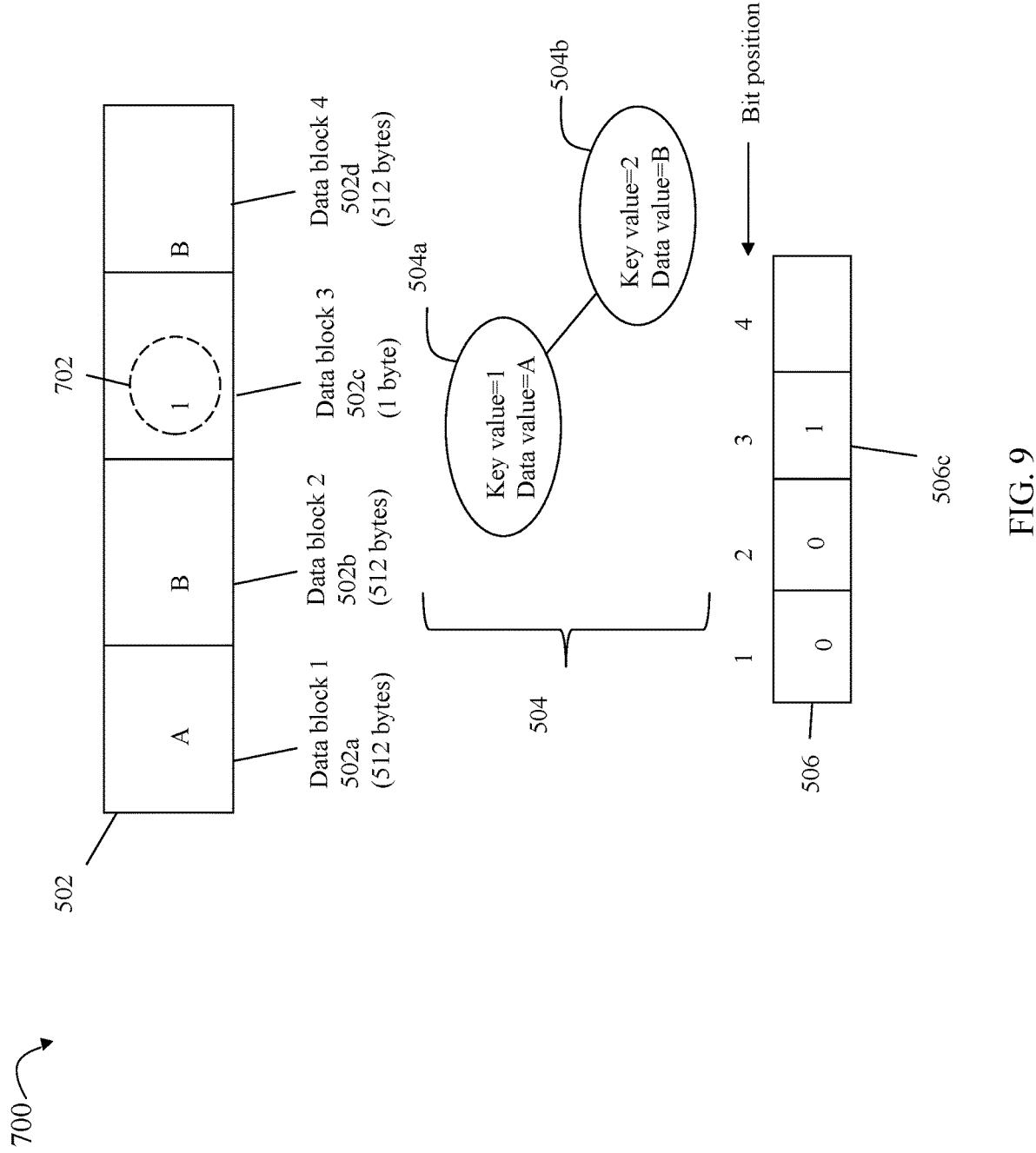

Reference is made to the example 700 of FIG. 9 in connection with a third iteration to process the third data block 502c. The third data block 502c=A is compared to the data pointed by the key values of the elements in BST recursively. If data block 502c matches the data value/block corresponding to an existing node in the BST, the 512 bytes of the current data block 502c are replaced by a single byte reference value which is equal to the key value of the matching existing node as returned by the search operation. If data block 502c does not match any existing node in the BST, it means that the data block 502c is a unique instance of a data block and the data block 502c is inserted as a new node into its proper location in the BST in accordance with BST properties as described herein and known in the art.

In connection with traversing the BST to determine whether data block 502c matches an existing node, the search is performed in accordance with known BST properties. For example, data block 502c "A" may be compared to the data block "A" represented by node 504a. It is determined that data block 502c="A" does match data block "A" as represented by node 504a. In this case as illustrated by 502, the data block 502c is replaced with a single byte reference or the key value associated with the matching BST entry 504a. Element 702 denotes the replacement of the data block 502c with the key value of 1 that references the unique prior occurring instance of the data block (502a) in the write data.

Additionally, the deduplication bit vector is updated as illustrated by element 506, whereby bit vector entry 3 506c corresponding to data block 502c is initialized to 1 (one) to denote the third data block 3 502c is not unique and is a duplicate of another preceding data block in the write data.

Figure 10:
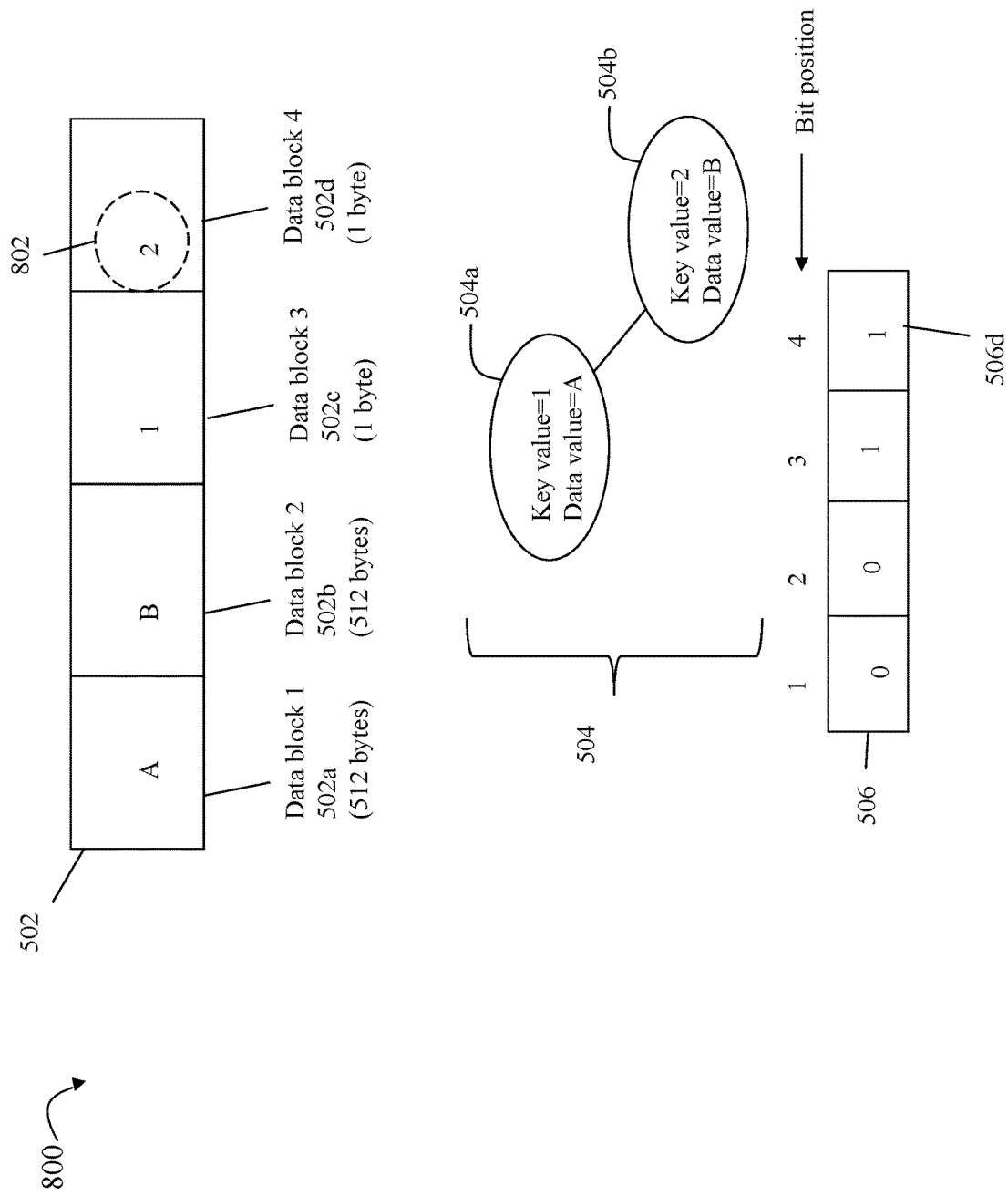

Reference is made to the example 800 of FIG. 10 in connection with a fourth iteration to process the fourth data block 502d. The fourth data block 502d=B is compared to the data pointed by the key values of the elements in BST recursively. If data block 502d matches the data value/block corresponding to an existing node in the BST, the 512 bytes of the current data block 502d are replaced by a single byte reference value which is equal to the key value of the matching existing node as returned by the search operation. If data block 502d does not match any existing node in the BST, it means that the data block 502d is a unique instance of a data block and the data block 502d is inserted as a new node into its proper location in the BST in accordance with BST properties as described herein and known in the art.

In connection with traversing the BST to determine whether data block 502d matches an existing node, the search is performed in accordance with known BST properties. For example, data block 502d "B" may be compared to the data block "A" represented by node 504a. It is determined that data block 502d="B" does not match data block "A" as represented by node 504a. However, data block 502d "B" is greater than the data value "A" represented by node 504a so the right subtree descendant nodes of 504a is further searched. Data block 502d "B" is compared to the data value "B" represented by node 504b and it is determined that data block 502d "B" does match data block "B" as represented by node 504b. In this case as illustrated by 502, the data block 502d is replaced with a single byte reference or the key value associated with the matching BST entry 504b. Element 802 denotes the replacement of the data block 502d with the key value of 2 that references the unique prior occurring instance of the data block (502b) in the write data 502.

Additionally, the deduplication bit vector is updated as illustrated by element 506, whereby bit vector entry 4 506d corresponding to data block 502d is initialized to 1 (one) to denote the fourth data block 4 502d is not unique and is a duplicate of another preceding data block in the write data.

In the example 800, element 502 denotes the final representation of the write data whereby each redundant or duplicate data block is replaced with a reference to the unique data block instance occurring in a prior data block of the write data 502. Thus, the write data 502 of FIG. 10 (as transmitted from the local to the remote data storage system for remote data replication) includes the unique data block instances with redundant data blocks replaced with corresponding key values of the unique instances. Additionally, the final resulting deduplication bit vector 506 of FIG. 10 identifies corresponding data blocks of the transmitted write data which are actual unique data block instances (e.g. bit vector entry of 0) and which are redundant (e.g., bit vector entry of 1) and thereby include a reference (key value) to the actual data block instance in the transmitted write data. In this example, the size of the deduplicated write data blocks 502 transmitted from the R1 to the R2 system in connection with data replication includes two 512 byte data blocks (502a, 502b) and two one byte references (502c, 502d). The foregoing size of the deduplicated data may be contrasted with the larger 2 KB size of the original write data (prior to deduplication such as in FIG. 7). Thus, the transmitted deduplicated write data in this example is approximately 50% of its original size.

In at least one embodiment, the write I/O operation and associated write data as transmitted from the local to the remote data storage system may include the deduplicated write data having a representation as illustrated by 502 of FIG. 10. The transmitted data may also include the deduplication bit vector 506 of FIG. 10 as metadata for the single host write I/O. In at least one embodiment, the transmitted data for the single host write I/O includes the actual length or size of the write data before deduplication. Consistent with discussion elsewhere herein in this embodiment, the receiving remote R2 data storage system performs processing including allocating a buffer having a size equal to the actual length or size of the write data before deduplication whereby the buffer will hold the final restored original version of the deduplicated data. The transmitted data for the single host write I/O may also include other information as may be used in connection with the transmitted data by the particular RDF embodiment. For example, the transmitted data may include the length or size of the write data after deduplication (in the transmitted representation) as well as connection information, a transaction identifier and other information as may be used by RDF.

What will now be described in more detail continuing with the above example is processing that may be performed by the R2 or remote system receiving the transmitted write data, such as just described.

Figure 11:
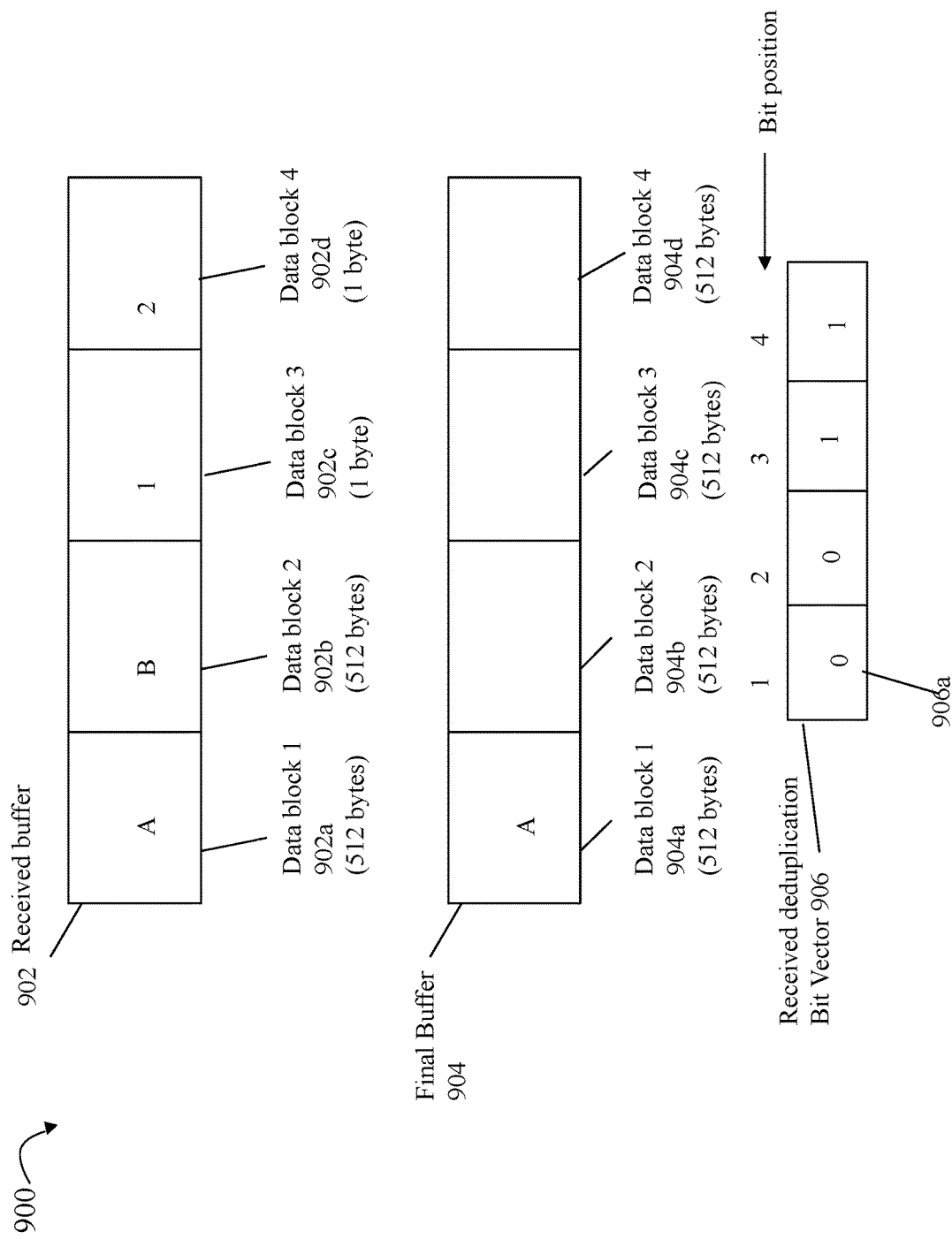
FIGS. 11, 12, 13 and 14 are examples illustrating processing that may be performed on a remote data storage system in an embodiment in accordance with techniques herein.

Referring to the example 900 of FIG. 11, shown is the received buffer 902 and the received deduplication bit vector 906. Element 902 and 906 may be included in the information transmitted from the local or R1 system as described above where such information is received by the remote or R2 system for the single host write I/O operation. The remote system may allocate storage for a final buffer 904 that will hold the final converted write data as a result of subsequent processing described below. The final buffer 904 will, after the result of processing as described herein, include the write data in its original form (e.g., as illustrated in FIG. 7) with deduplicated references or key values replaced with the actual data block instances. The size of the final buffer 904 may be the original size of the write data prior to deduplication, which in this example, is 2 KB or 4-512 byte data blocks. The remote R2 system may calculate the number of data blocks in the original write data based on the size or length of the original write data transmitted from the R1 local system. With reference to this particular example, the size of the original write data transmitted is 2 KB bytes which is then divided by the size of each data block (which is 512 bytes) thereby indicating that there are N=4 data blocks in the original data that will be restored from the deduplicated write data received from the R1 or local data storage system (e.g., N=original write data size/ 512 bytes).

Generally, processing performed by the remote system traverses the first N bit bit positions in the bit vector 906 corresponding to the N data blocks of the original write data. If a bit value for a corresponding data block is 0, it means that the received buffer includes the actual unique data block instance, whereby 512 bytes of the data block are copied from the received buffer 902 to the final buffer 904. If a bit value for a corresponding data block is 1, it means that the received buffer includes a single byte reference value rather than the actual data block whereby processing is now performed to obtain the actual data block (dereference the single byte reference value) pointed to by the reference value and copies the data block to the final buffer 904.

In connection with a first iteration with reference to the example 900 (with N=4 denoting the number of iterations, data blocks of the original write data, and thus entries of the deduplication bit vector traversed), entry 1 906*a* of the deduplication bit vector 906 corresponding to the first data block of the write data is examined. Since the bit value 906*a* is 0, the received data buffer 902 includes the first data block in the corresponding first 512 bytes 902*a*. As such, processing is performed to copy the first 512 bytes 902*a* of the received buffer 902 to the final buffer 904. In particular, the first data block 902*a*="A" is copied to the 512 bytes denoted by the first data block 904*a* of the final buffer 904.

Figure 12:
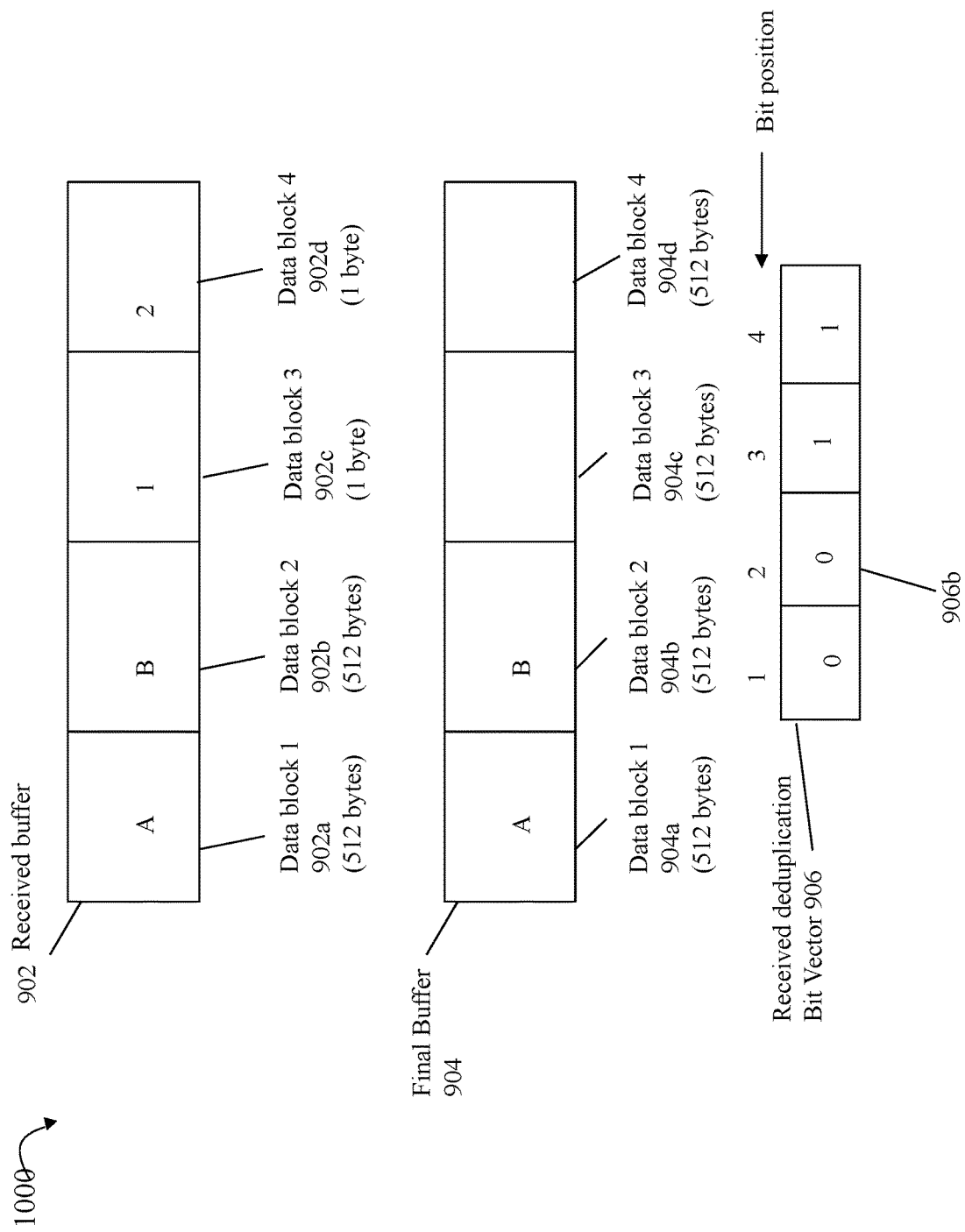

In connection with a second iteration with reference to the example 1000 of FIG. 12, entry 2 906*b* of the deduplication bit vector 906 corresponding to the second data block of the write data is examined. Since the bit value 906*b* is 0, the received data buffer 902 includes the second data block in the corresponding second 512 bytes 902*b*. As such, processing is performed to copy the second 512 bytes 902*b* of the received buffer 902 to the final buffer 904. In particular, the second data block 902*b*="B" is copied to the 512 bytes denoted by the second data block 904*b* of the final buffer 904.

Figure 13:
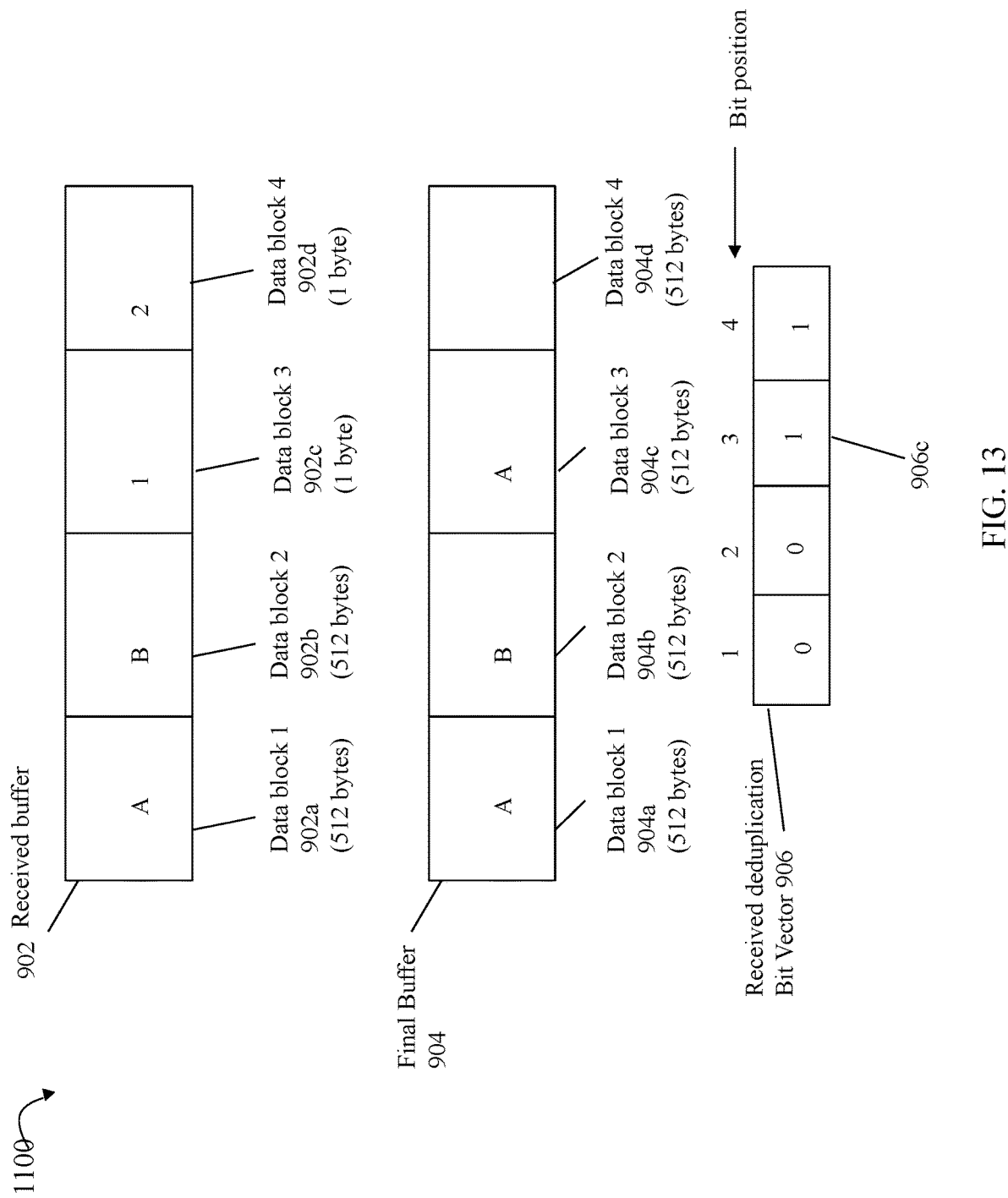

In connection with a third iteration with reference to the example 1100 of FIG. 13, entry 3 906*c* of the deduplication bit vector 906 corresponding to the third data block of the write data is examined. Since the bit value 906*c* is 1, the next single byte 902*c* of received data buffer 902 includes a reference to the unique data block (thereby indicating that the third data block of the original data prior to deduplication is a duplicate of another previously occurring data block of the write data). As such, processing is performed to read the key value=1 from the byte 902*c*, and obtain the actual data block identified by the key value=1. Since a key value=1 denotes the first 512 byte data block 902*a* of the received buffer 902, the data block="A" is read from 902*a* and copied to the final buffer 904. In particular, the third data block 902*b*="A" is copied from 902*a* to the 512 bytes denoted by the third data block 904*c* of the final buffer 904.

Figure 14:
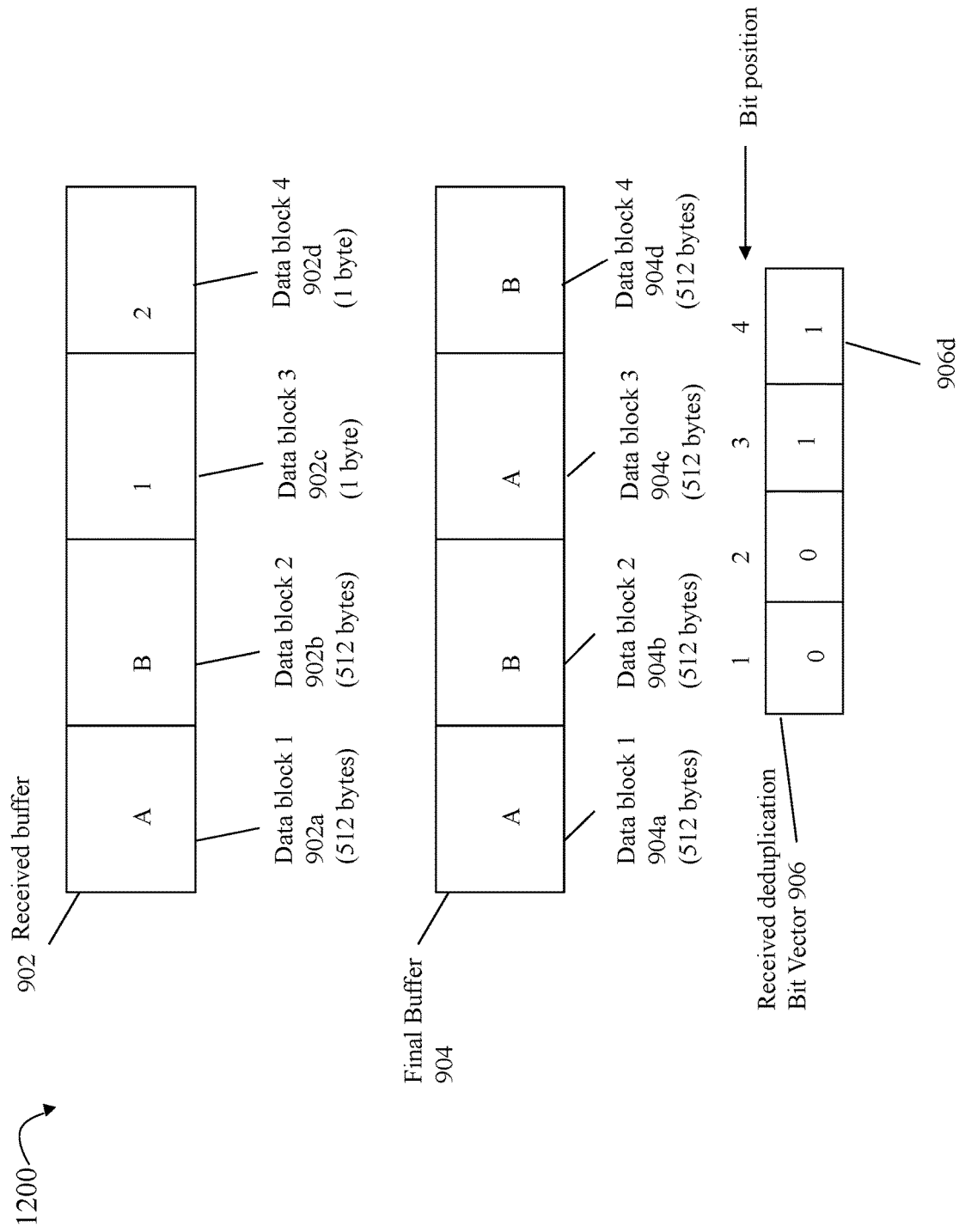

In connection with a fourth iteration with reference to the example 1200 of FIG. 14, entry 4 906*d* of the deduplication bit vector 906 corresponding to the fourth data block of the write data is examined. Since the bit value 906*d* is 1, the next single byte 902*d* of received data buffer 902 includes a reference to the unique data block (thereby indicating that the third data block of the original data prior to deduplication is a duplicate of another previously occurring data block of the write data). As such, processing is performed to read the key value=2 from the byte 902*d*, and obtain the actual data block identified by the key value=2. Since a key value=2 denotes the second 512 byte data block 902*b* of the received buffer 902, the data block="B" is read from 902*b* and copied to the final buffer 904. In particular, the fourth data block 902*d*="B" is copied from 902*b* to the 512 bytes denoted by the fourth data block 904*d* of the final buffer 904.

What will now be described are flowcharts of processing steps that may be performed in an embodiment in accordance with techniques herein. The flowcharts of FIGS. 15 and 16 summarize processing described above.

Figure 15:
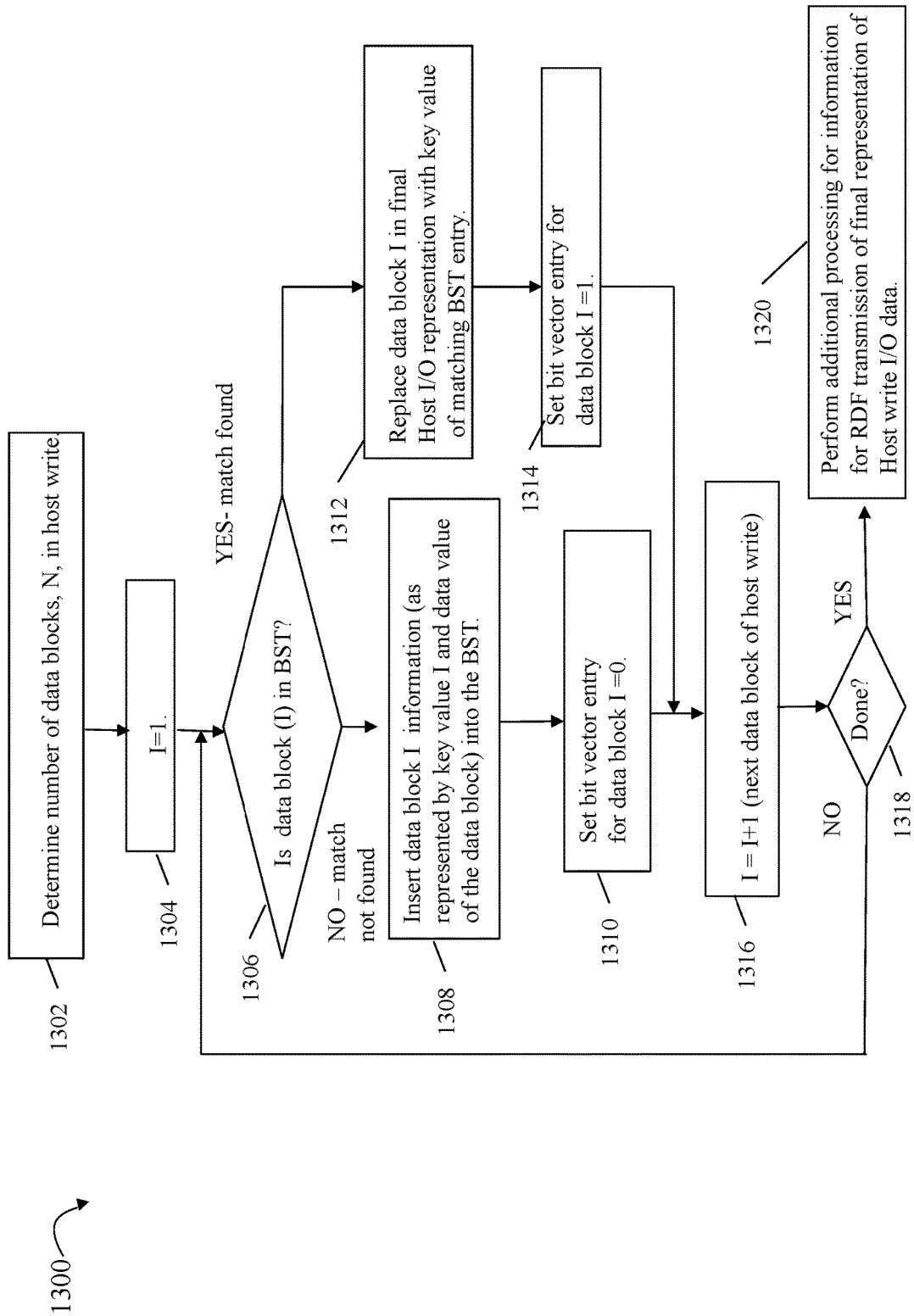
FIGS. 15 and 16 are flowcharts summarizing processing that may be performed in an embodiment in accordance with techniques herein.
Figure 16:
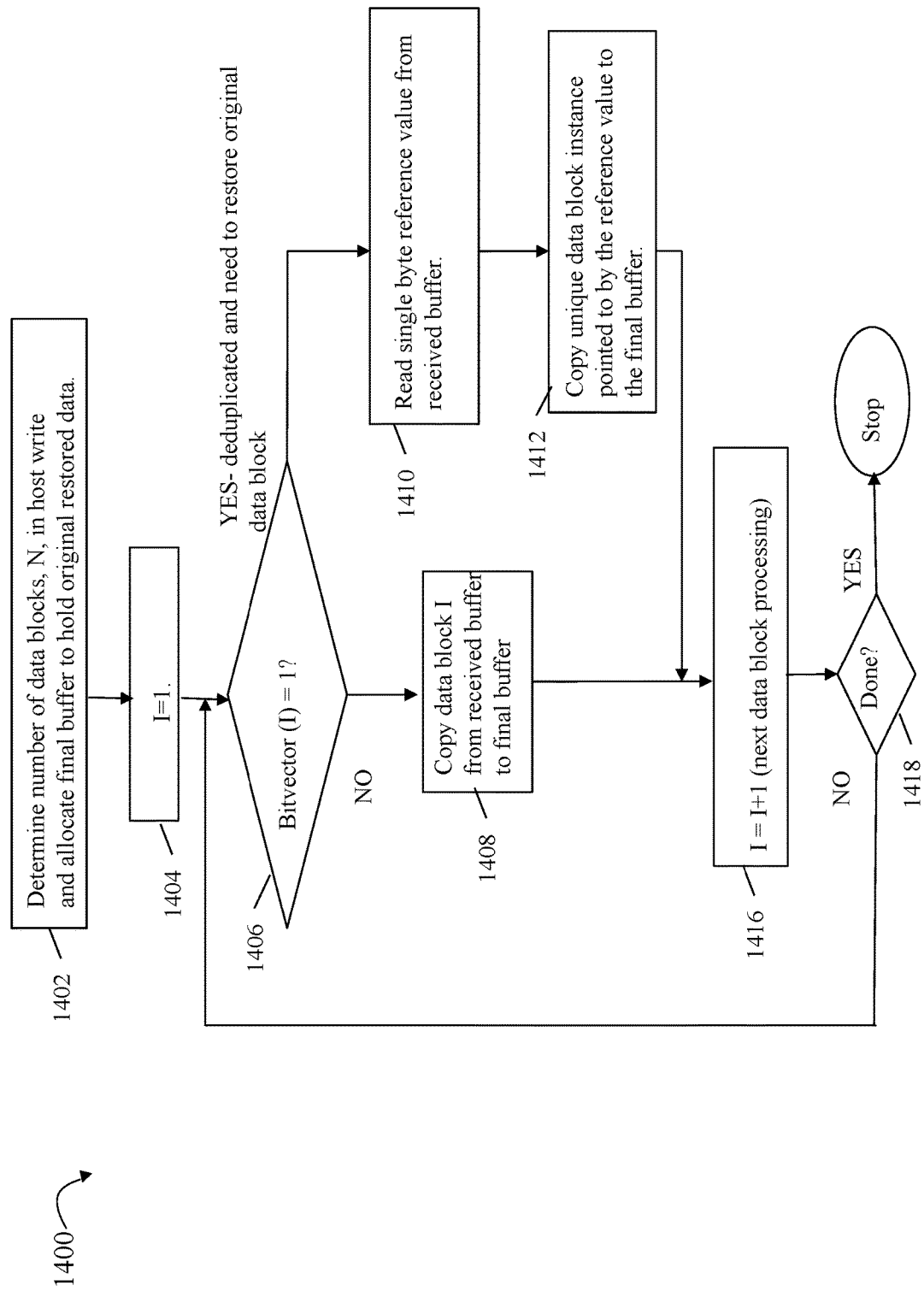

Referring to FIG. 15, shown is a flowchart 1300 summarizing processing as may be performed on an R1 or local data storage system in an embodiment in accordance with techniques herein. At step 1302, processing is performed to determine the number of data blocks, N, in the host write being processed. N may denote the number of data blocks of write data written by the single host I/O. As will be appreciated by those skilled in the art, in the event that the size of the host write data is not evenly divisible by the data block size, such as 512 bytes, whereby there is a remainder when dividing size of write data by the data block size, the number of data blocks may be determined by rounding up to the next integer value of the division operation. At step 1304, I is initialized to 1 where I denotes the current data block of the write data being processed by a current iteration of the loop beginning at step 1306. At step 1306, a determination is made as to whether data block I of the write data is in the BST. Step 1306 may evaluate to yes if a match is found between the data block I and the data value associated with an existing node in the BST. If step 1306 evaluates to no, control proceeds to step 1308 where data block I is inserted into the BST. In particular in step 1308, data block I information, as represented by key value I and data value of the data block, is inserted into the BST. From step 1308, processing proceeds to step 1310 where the bit vector position or entry for data block I is set to 0. From step 1310, control proceeds to step 1316.

If step 1306 evaluates to yes, control proceeds to step 1312 where processing is performed to replace data block I in the final host write I/O represents with the key value of the matching BST entry. From step 1312, control proceeds to step 1314 where the bit vector position or entry for data block I is set to 1. From step 1314, control proceeds to step 1316.

At step 1316, I is incremented by 1 to denote the next data block of the host write to be processed by the next loop iteration. At step 1318, a determination is made as to whether all data blocks of the write data of the host I/O operation have been processed. If step 1318 evaluates to no, control proceeds to step 1306 for the next loop iteration to process the next write data block. If step 1318 evaluates to yes, control proceeds to step 1320. In step 1320, additional processing may be performed to obtain the needed information for the RDF transmission of the final representation of the host write I/O data. Step 1320 may include, for example, processing to place the data in a form suitable for transmission from the local to the remote data storage system using RDF. Step 1320 may include, for example, formatting a message for transmission that includes the deduplicated form of the host write data, the deduplication bit vector, the size of the write data prior to deduplication, and the like.

Referring to FIG. 16, shown is a flowchart 1400 summarizing processing as may be performed on an R2 or remote data storage system in an embodiment in accordance with techniques herein. The remote data storage system receives information including the deduplicated write data, the deduplication bit vector and the size of the original write data before deduplication. At step 1402, processing is performed to determine the number of data blocks, N, in the host write being processed and allocate storage for a final buffer to hold the original restored write data. As noted above, N may be calculated using the size of the original write data and the size of each data block (e.g., determine how many 512 byte data blocks store the original write data which in this example N=2 Kbytes/512 bytes=4 data blocks). At step 1404, I is initialized to 1. At step 1406, a determination is made as to whether the deduplication bit vector[I]=1, where I corresponds to a current data block of the write data for which processing is being performed. If step 1406 evaluates to yes, it means that the deduplicated write data as received includes a reference to a data block and processing is performed to restore the original data block I in the final buffer. If step 1406 evaluates to no, it means that the deduplicated write data as received includes the actual data block I. If step 1406 evaluates to no, control proceeds to step 1408 to copy data block I from the received buffer (including the deduplicated write data) to the final buffer. From step 1408, control proceeds to step 1416. If step 1406 evaluates to yes, control proceeds to step 1410 to read the next single byte reference value from the received buffer. From step 1410 control proceeds to step 1412 to copy the unique data block instance pointed to by the reference value to the final buffer. From step 1412, control proceeds to step 1416.

In step 1416, I is incremented by 1 to denote the next data block of the original host write data to be processed by the next loop iteration. At step 1418, a determination is made as to whether processing has been performed for all of the N data blocks of the original write data (e.g., all N data blocks of original write data have been restored to the final buffer in accordance with associated entries of the deduplication bit vector). If step 1418 evaluates to yes, processing stops. If step 1418 evaluates to no, control proceeds to step 1406.

An embodiment may implement the techniques herein using code executed by a processor. For example, an embodiment may implement the techniques herein using code which is executed by a processor of the data storage system, or more generally any other system. As will be appreciated by those skilled in the art, the code may be stored on the data storage system on a computer-readable medium having any one of a variety of different forms including volatile and nonvolatile, removable and non-removable media implemented in any method or technology for storage of information such as computer readable instructions, data structures, program modules or other data. Computer-readable media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing write operations comprising:
receiving, at a first data storage system, a write operation from a host that writes first data to a first device of the first data storage system, wherein the first device is configured for replication by a remote data facility on a second device of a second data storage system, wherein the first device and the second device are provisioned from non-volatile storage, and wherein the first data storage system and the second data storage system are different data storage systems configured for remote replication by the remote data facility using a link between the first data storage system and the second data storage system;
writing the first data to the first device of the first data storage system;
performing first processing that converts the first data to a deduplicated data representation;
transmitting, by the remote data facility over the link between the first data storage system and the second data storage system, the deduplicated data representation from the first data storage system to the second data storage system; and
responsive to receiving the deduplicated data representation, performing second processing on the second data storage system that converts the deduplicated data representation to its original form in accordance with the first data.

2. The method of claim 1, wherein the first processing includes partitioning the first data into a plurality of data blocks.

3. The method of claim 2, wherein the first processing includes:
traversing the plurality of data blocks and creating a node in a binary search tree for each unique data block included in the plurality of data blocks, wherein the node includes a key value corresponding to a position of said each unique data block in the first data and the node includes the data block as a data value.

4. The method of claim 3, wherein the deduplicated data representation includes a deduplication bit vector with a different entry corresponding to each of the plurality of data blocks, and wherein the deduplicated data representation includes deduplicated write data corresponding to the first data.

5. The method of claim 4, wherein an entry of the deduplication bit vector corresponding to a particular one of the plurality of data blocks indicates whether the deduplicated write data includes the particular one of the data blocks or otherwise includes a reference to the particular one the data blocks.

6. The method of claim 5, wherein the second processing includes:
determining, in accordance with the deduplication bit vector and the deduplicated write data, a restored version of deduplicated write data.

7. The method of claim 6, wherein the second processing includes:
traversing each entry of the deduplication bit vector corresponding to one of the plurality of data blocks of the first data and determining whether said each entry indicates the deduplicated write data includes the one data block or otherwise includes a reference to the one data block.

8. The method of claim 7, wherein the second processing includes:
if said each entry indicates the deduplicated write data includes the one data block, copying the one data block from the deduplicated write data to the restored version of deduplicated write data; and if said each entry indicates the deduplicated write data includes the reference to the one data block, copying the one data block pointed to by the reference from the deduplicated write data to the restored version of the deduplicated write data.

9. The method of claim 8, wherein the reference identifies a position in the first data of the one data block where the position occurs in the first data prior to another position in the first data associated with said each entry.

10. The method of claim 1, wherein the first device is configured for synchronous replication on a second device of the second data storage system.

11. The method of claim 1, wherein the first device is configured for asynchronous replication on a second device of the second data storage system.

12. A system comprising:
a first data storage system with a first memory and at a first processor, wherein the first memory includes code that, when executed, performs a method comprising:
receiving, at the first data storage system, a write operation from a host that writes first data to a first device of the first data storage system, wherein the first device is configured for replication by a remote data facility on a second device of a second data storage system, wherein the first device and the second device are provisioned from non-volatile storage, and wherein the first data storage system and the second data storage system are different data storage systems configured for remote replication by the remote data facility using a link between the first data storage system and the second data storage system;
writing the first data to the first device of the first data storage system;
performing first processing that converts the first data to a deduplicated data representation; and
transmitting, by the remote data facility over the link between the first data storage system and the second data storage system, the deduplicated data representation from the first data storage system to the second data storage system; and
the second data storage system with a second memory and at a second processor, wherein the second memory includes code that, when executed, performs a method comprising:
responsive to receiving the deduplicated data representation, performing second processing on the second data storage system that converts the deduplicated data representation to its original form in accordance with the first data.

13. A non-transitory computer readable medium comprising code stored thereon that, when executed, perform a method of processing write operations comprising:
receiving, at a first data storage system, a write operation from a host that writes first data to a first device of the first data storage system, wherein the first device is configured for replication by a remote data facility on a second device of a second data storage system, wherein the first device and the second device are provisioned from non-volatile storage, and wherein the first data storage system and the second data storage system are different data storage systems configured for remote replication by the remote data facility using a link between the first data storage system and the second data storage system;
writing the first data to the first device of the first data storage system;
performing first processing that converts the first data to a deduplicated data representation;
transmitting, by the remote data facility over the link between the first data storage system and the second data storage system, the deduplicated data representation from the first data storage system to the second data storage system; and
responsive to receiving the deduplicated data representation, performing second processing on the second data storage system that converts the deduplicated data representation to its original form in accordance with the first data.

14. The non-transitory computer readable medium of claim 13, wherein the first processing includes partitioning the first data into a plurality of data blocks.

15. The non-transitory computer readable medium of claim 14, wherein the first processing includes:
traversing the plurality of data blocks and creating a node in a binary search tree for each unique data block included in the plurality of data blocks, wherein the node includes a key value corresponding to a position of said each unique data block in the first data and the node includes the data block as a data value.

16. The non-transitory computer readable medium of claim 15, wherein the deduplicated data representation includes a deduplication bit vector with a different entry corresponding to each of the plurality of data blocks, and wherein the deduplicated data representation includes deduplicated write data corresponding to the first data.

17. The non-transitory method of claim 16, wherein an entry of the deduplication bit vector corresponding to a particular one of the plurality of data blocks indicates whether the deduplicated write data includes the particular one of the data blocks or otherwise includes a reference to the particular one the data blocks.

18. The non-transitory computer readable medium of claim 17, wherein the second processing includes:
determining, in accordance with the deduplication bit vector and the deduplicated write data, a restored version of deduplicated write data.

19. The non-transitory computer readable medium of claim 18, wherein the second processing includes:
traversing each entry of the deduplication bit vector corresponding to one of the plurality of data blocks of the first data and determining whether said each entry indicates the deduplicated write data includes the one data block or otherwise includes a reference to the one data block.

20. The non-transitory computer readable medium of claim 19, wherein the second processing includes:
if said each entry indicates the deduplicated write data includes the one data block, copying the one data block from the deduplicated write data to the restored version of deduplicated write data; and
if said each entry indicates the deduplicated write data includes the reference to the one data block, copying the one data block pointed to by the reference from the deduplicated write data to the restored version of the deduplicated write data, and wherein the reference identifies a position in the first data of the one data block where the position occurs in the first data prior to another position in the first data associated with said each entry.

* * * * *